United States Patent
Pawlus et al.

(10) Patent No.: US 12,500,392 B2
(45) Date of Patent: Dec. 16, 2025

(54) WAVELENGTH CONTROL OF MULTI-WAVELENGTH LASER

(71) Applicants: VRIJE UNIVERSITEIT BRUSSEL, Brussels (BE); TECHNISCHE UNIVERSITAT DARMSTADT, Darmstadt (DE)

(72) Inventors: Robert Pawlus, Weiterstadt (DE); Martin Virte, Brussels (BE); Hugo Thienpont, Gooik (BE); Stefan Breuer, Darmstadt (DE)

(73) Assignees: VRIJE UNIVERSITEIT BRUSSEL, Brussels (BE); TECHNISCHE UNIVERSITAT DARMSTADT, Darnstadt (DE)

( * ) Notice: Subject to any disclaimer, the term of this patent is extended or adjusted under 35 U.S.C. 154(b) by 809 days.

(21) Appl. No.: 17/767,148

(22) PCT Filed: Oct. 8, 2020

(86) PCT No.: PCT/EP2020/078345
§ 371 (c)(1),
(2) Date: Apr. 7, 2022

(87) PCT Pub. No.: WO2021/069629
PCT Pub. Date: Apr. 15, 2021

(65) Prior Publication Data
US 2022/0376475 A1     Nov. 24, 2022

(30) Foreign Application Priority Data
Oct. 8, 2019   (EP) ..................................... 19201970

(51) Int. Cl.
*H01S 5/14*    (2006.01)
*H01S 5/026*   (2006.01)
(Continued)

(52) U.S. Cl.
CPC ............ *H01S 5/142* (2013.01); *H01S 5/0265* (2013.01); *H01S 5/0654* (2013.01); *H01S 5/1096* (2013.01); *H01S 5/125* (2013.01)

(58) Field of Classification Search
CPC .. H01S 5/0654; H01S 5/142; H01S 5/00–509; H01S 5/06–0657; H01S 5/0653
See application file for complete search history.

(56) References Cited

U.S. PATENT DOCUMENTS 5,351,317 A * 9/1994 Weber ................ G02B 6/12014
385/27
5,463,647 A  10/1995 Pan
(Continued)

FOREIGN PATENT DOCUMENTS

EP        2341378 A1 * 7/2011 ......... G02B 6/12011
WO   WO-02079820 A2 * 10/2002 ................ H01S 5/14
(Continued)

OTHER PUBLICATIONS

Extended European Search Report from corresponding EP Application No. 19201970.1, Apr. 22, 2020.
(Continued)

*Primary Examiner* — Minsun O Harvey
(74) *Attorney, Agent, or Firm* — Workman Nydegger

(57) ABSTRACT

A photonic integrated circuit device includes a lasing cavity for resonating at a plurality of discrete wavelengths and an optical feedback cavity operably coupled to the lasing cavity via a front surface of the lasing cavity. The optical feedback cavity has a reflective element for reflecting light, at least partially, back into the lasing cavity to form a resonant Fabry-Perot cavity between the front surface and the reflective element. The optical feedback cavity includes a variable phase shifting element adapted for receiving an input signal to control a phase shift of light propagating in the optical feedback cavity. The amount of light entering the lasing
(Continued)

cavity from the optical feedback cavity is low enough to avoid dynamic instability of the lasing cavity. The reduction in light is obtained using an attenuator.

20 Claims, 13 Drawing Sheets

(51) Int. Cl.
*H01S 5/065* (2006.01)
*H01S 5/10* (2021.01)
*H01S 5/125* (2006.01)

(56) References Cited

U.S. PATENT DOCUMENTS

| | | | |
|---|---|---|---|
| 2009/0185585 A1 | 7/2009 | Farmiga et al. | |
| 2016/0170141 A1 | 6/2016 | Luo et al. | |
| 2020/0103679 A1* | 4/2020 | Lee | H01S 5/4062 |
| 2020/0295536 A1* | 9/2020 | Khan | H01S 5/14 |
| 2020/0366061 A1* | 11/2020 | He | H01S 5/0654 |

FOREIGN PATENT DOCUMENTS

WO    WO-2004088801 A2 * 10/2004 ............ B82Y 20/00
WO       2009017398 A1    2/2009

OTHER PUBLICATIONS

B. Docter et al., "Discreetly Tunable Laser Based on Filtered Feedback for Telecommunication Applications," IEEE Journal of Selected Topics in Quantum Electronics, vol. 16, Issue 5, Sep. 1, 2010, pp. 1405-1412.

M. Virte et al., "Switching Between Ground and Excited States by Optical Feedback in a Quantum Dot Laser Diode," Applied Physics Letters, vol. 105, Issue 12, Sep. 19, 2014, 5 pages.

M. Naderi et al., "Two-Color Multi-Section Quantum Dot Distributed Feedback Laser," Optics Express, vol. 18, No. 26, Dec. 8, 2010, pp. 27028-27035.

P. Spencer et al., "Coupled-Cavity Effects in FM Semiconductor Lasers," Journal of Lightwave Technology, IEEE, Jun. 1, 1999, vol. 17, No. 6, pp. 1072-1078.

International Search Report and Written Opinion from corresponding PCT Application No. PCT/EP2020/078345, Feb. 2, 2021.

* cited by examiner

WAVELENGTH CONTROL OF MULTI-WAVELENGTH LASER

TECHNICAL FIELD

The present invention relates to the field of multi-wavelength lasers. The present invention specifically relates to an integrated photonic circuit device and related methods and uses.

BACKGROUND ART

Lasers that emit simultaneously light at different wavelengths are known in the art. However, the control of the emission properties of such multi-wavelength lasers, e.g. control of the power balance between the different modes, the total output power, and/or discrete or continuous tuning of the wavelength, remains challenging. More precisely, a need exists in the art for advanced control techniques for piloting each wavelength independently.

Prior-art devices that comprise built-in spectrally selective components can ensure that the multi-wavelength emission exhibits a rather robust multi-wavelength output. However, their emission properties can only be marginally changed through variations of the injection current or device temperature. Tuning the balance between the different wavelengths or switching from one to the other is typically not possible.

Devices with broadband emission and external forcing are also known in the art. Such devices do not comprise any spectrally selective components, and typically exhibit a broad multimode behavior. A controlled multi-wavelength emission can then be obtained by external forcing, typically through wavelength selective optical feedback. This concept is highly versatile, but the external forcing approach requires a complex and often bulky setup that requires careful design, control and/or alignment. Additionally, these difficulties are often associated with stability issues.

US 2009/0185585 discloses an external cavity laser comprising a lasing cavity, e.g. a semiconductor diode laser, and an optically coupled feedback cavity having differently spaced resonant lasing and feedback mode frequencies. The lasing modes can be matched to selected feedback modes. A current driving the lasing cavity can be adjusted to shift individual lasing modes into alignment with selected feedback modes. The air-filled feedback cavity is formed between a front surface of the lasing cavity and a pivotable reflective diffraction grating along the common optical axis. By pivoting the reflective diffraction grating, the frequency of light that is reflected onto the lasing cavity is controlled, while a collimating lens ensures that the selected wavelength component is focused into the lasing cavity with good selectivity. However, it is a disadvantage of this approach that manufacturing of moving parts, e.g. the pivotable reflector and the associated actuating components is complex and costly. Furthermore, moving parts can be prone to mechanical failure and/or undesired influences of ambient pressure, temperature, acceleration and/or vibrations.

Multi-section devices, as known in the art, relate to a laser structure that comprises different gain sections, either coupled with each other or not. By relying on various physical mechanisms, extra gain to one given wavelength can be achieved. For example, a grating can be used to create several wavelength selective channels that can then be tuned independently via the gain section. This provides an intermediate solution between a single cavity multi-wavelength laser (for which a single gain section is sufficient) and the combination of multiple independent single-wavelength lasers. However, the whole laser system can be significantly bulkier than their single cavity counterparts and requires controlling one gain section per wavelength, thus increasing the complexity of use.

WO 2009/017398 discloses a semiconductor laser device comprising a lasing cavity and adapted for selectively resonating at a plurality of discrete output wavelengths. The lasing cavity is coupled to a feedback section for providing an optical feedback signal at a feedback wavelength to force the lasing cavity into resonating at a selected output wavelength. The feedback section can comprise a plurality of independent cavities with semiconductor optical amplifiers that can be independently biased. An Arrayed Waveguide Grating routes each of the discrete wavelengths to a corresponding cavity, where its gain can be independently controlled by a separate amplifier.

It is known in the art to force a laser without spectrally selective elements, such as a simple Fabry-Perot laser or semiconductor ring laser, to emit at a different wavelength by means of a filtered optical feedback. An arrayed waveguide grating (AWG) spectrally selects different wavelength bands (e.g. 4 different bands) dispatched into corresponding distinct branches, each comprising an electrically controlled optical amplifier. A broadband reflector, or alternatively a further AWG identical to the aforementioned AWG, can then be used to combine light from the branches and reinject the light into the laser. The amplifiers can be precisely controlled to balance the gain for the different wavelengths as needed. An example of this approach can be found in B. Docter et al, "Discreetly tunable laser based on filtered feedback for telecommunication Applications", Selected Topics in Quantum. Electronics, IEEE Journal of, 16, 1405. However, it is a disadvantage of this approach that the amplifiers need to be precisely controlled, e.g. requiring four precisely tuned input signals, to control the system.

Optical feedback approaches are known in the art, in which dual-wavelength emission in quantum dot (QD) lasers is triggered. QD lasers can emit simultaneously from two intrinsic energy states, a ground state (GS) and an excited state (ES). For example, M. Virte et al, "Switching between ground and excited states by optical feedback in a quantum dot laser diode", Appl. Phys. Lett. 105, 121109 describes an optical feedback approach in dual-wavelength quantum dot lasers. An external mirror on a piezo actuator can be used to vary an external cavity length at the sub-micrometer scale, thus tuning the phase of the light being fed back to the cavity. By tuning the phase of the feedback, it becomes possible to switch between dual wavelength emission in the GS and the ES to emission in only the ES.

N. Naderi et al, "Two-color multi-section quantum dot distributed feedback laser", Optics Express 18, 27028, disclose two-section quantum dot lasers. When homogeneously biasing the laser, i.e. when powering as a single section laser, the device only emits from the ES. However, GS emission can be triggered using a long unfiltered optical feedback which lead to simultaneous GS+ES emission, i.e. dual-wavelength emission. On the other side, the authors highlight that the same result can be obtained by biasing the two sections differently. However, it is a disadvantage of this approach that even though the naturally depressed GS mode can be triggered, the ES mode is not suppressed.

SUMMARY OF THE INVENTION

It is an objective of the present invention to provide good, efficient, simple and/or compact means and methods to control the emission of a multi-wavelength laser such as a dual-wavelength laser, e.g. by phase-controlled optical feedback to pilot a multi-wavelength laser such as a dual-wavelength laser. A multi-wavelength laser can emit coherent light at a multiple of wavelengths, e.g. 2 or more.

Embodiments of the present invention provide a photonic integrated circuit device.

Embodiments of the present invention have the advantage that good control of the wavelength components emitted by a multi-wavelength laser, e.g. a multi-color laser, such as a dual-wavelength laser, e.g. a two-color laser, can be achieved by optical feedback.

Embodiments of the present invention have the advantage that a good control of the wavelength components emitted by a multi-wavelength laser, e.g. a multi-color laser, such as a dual-wavelength laser, e.g. a two-color laser, can be obtained for any wavelength separation supported by the laser gain medium; e.g. at least 1 nm; e.g. up to 10 nm, e.g. up to at least 50 nm or more. It is an advantage of embodiments of the present invention wavelength separation can be obtained independently of the spectral separation between the wavelengths emitted by the laser. The present invention can be applied to any wavelength differences, well beyond neighboring longitudinal modes. The present invention can relate to multi-wavelength lasers whose wavelengths are not neighboring longitudinal modes.

Embodiments of the present invention have the advantage that a small footprint can be achieved, e.g. a device in accordance with embodiments can have a small and/or simple structure. Thus, good integration on an integrated circuit such as a photonic integrated circuit is possible in accordance with embodiments of the present invention.

Furthermore, a direct relation exists between size and/or area of a photonic integrated circuit device and the cost of the integrated circuit device, such that the impact of compactness on cost can be substantial.

Some or all of the embodiments of the present invention have the advantage that a device in accordance with embodiments can be monolithically integrated. Monolithically integrated devices can have advantages over hybrids or free space designs as the implementation of these methods is not that straightforward as they need excellent coupling and don't have an attenuator. Embodiments of the present invention have the advantage that a device in accordance with embodiments can be manufactured by processes that are compatible with generic multi-project semiconductor wafer methods, e.g. thus easily allowing mass manufacture. Particularly, for a multiwavelength laser comprising a lasing cavity, e.g. a semiconductor diode laser, and an external optically coupled feedback cavity, the external cavity (e.g. an optical feedback cavity) can be monolithically integrated on the same photonic integrated circuit as the laser cavity. Furthermore, by not requiring an arrayed waveguide grating, a small size and footprint and good integration can be achieved.

Embodiments of the present invention have the advantage that a short cavity, e.g. substantially shorter than in at least some of the prior-art solutions, can be used. Thus, operation can be achieved in what is known as the short cavity regime, and dynamical instabilities can be reduced or avoided. Moreover, the response time of the system is significantly reduced.

In embodiments of the present invention the resonance frequency of the optical feedback cavity, i.e. the inverse of the round-trip (back-and-forth) propagation time of the laser light inside the optical feedback cavity, is greater than the relaxation oscillation frequency of the lasing cavity. Thus, the feedback can quickly adapt to changes of the light quality received from the lasing cavity in a time scale that is smaller than the time scale on which changes in the light quality, e.g. the amplitude, typically occur during stabilization of the laser output. This relationship can be directly and unambiguously verified when examining a device according to embodiments of the present invention. The round-trip propagation time, and, hence, the resonance frequency, can be experimentally determined or inferred from the optical characteristics of the medium in the feedback cavity whereby any of the optical components can be taken into account. The relaxation oscillation frequency can be experimentally determined or inferred from simulation of the lasing cavity design. The reference to "greater than" hereinabove can refer to about equal to or greater than, e.g. to equal to or greater than, or to at least two times greater than, e.g. to at least four times greater than, e.g. to at least ten times greater than; in other words, to about equal to or preferably (substantially or sufficiently) greater than. An equivalent definition is provided in terms of the round-trip propagation time of the feedback cavity being "less than" the corresponding relaxation oscillation time of the lasing cavity can be formulated.

Embodiments of the present invention have the advantage that a single laser cavity can be used to produce multiple controllable output wavelengths, thus reducing the cost relative to using a plurality of lasers operating at different wavelengths and using a combiner to merge the outputs. For example, a photonic integrated circuit device or a multi-wavelength laser can consist essentially of a single laser cavity producing multiple controllable output wavelengths of coherent light.

Alternatively, prior-art solutions that avoid the use of a plurality of distinct lasers may rely on internal control or external forcing methods that increase the size and complexity of the system and increase the complexity of the control strategy. Yet, embodiments of the present invention provide in a small size, simple and easily controlled methods and devices.

Embodiments of the present invention have the advantage that a single control signal, e.g. a single control voltage, can be used to control more than two, e.g. three or more, modes, e.g. ten modes or possibly even more. For example a method of operating a photonic integrated circuit device can consist essentially of a single control signal, e.g. a single control voltage, to control more than two, e.g. three or more, modes, e.g. ten modes or possibly even more. For example, by relying on an interferometric effect in the external cavity (e.g. an optical feedback cavity), as opposed to conventional spectrally selective elements in a feedback loop comprising multiple branches, the laser emission can be controlled with a single input signal instead of one signal per branch.

Embodiments of the present invention have the advantage that control of the multi-wavelength laser modes can be achieved regardless of the laser design. Thus, embodiments of the present invention may be applied, at least potentially, to any laser type, for any optical wavelengths, and for any optical power level, even though design parameters, such as the length of the cavity, might need to be adjusted in a straightforward manner depending on the specific application.

Thus, a laser can be extended, in accordance with embodiments of the present invention, by a small and simple structure, controlled by a single input, that provides a precise tuning of the laser emission properties. For semiconductor lasers, e.g. laser diodes, this structure can advantageously be monolithically integrated on the same chip as the semiconductor laser.

Embodiments of the present invention have the advantage that no mechanical tuning or moving parts, such as piezo-actuators, are required (i.e. an electronic or motionless control or electronic driving or electronic tuning). This facilitates easy integration and manufacture, and may provide a good robustness against undesirable environmental conditions, such as influences of vibrations, temperature and/or pressure.

Embodiments of the present invention have the advantage that, for e.g. a quantum dot laser, a naturally depressed mode can be triggered while simultaneously attenuating, e.g. attenuating significantly or suppressing the naturally favored mode, such that partial or complete or substantially complete switching can be achieved.

Embodiments of the present invention have the advantage that an external cavity length e.g. an optical feedback cavity length can be precisely tuned to ensure that the targeted wavelengths are not in-phase, i.e. that the interferometric effect can be used to selectively boost one or the other wavelength.

Embodiments of the present invention have the advantage that the external cavity size, e.g. an optical feedback cavity size, can be tuned to prevent possible undesired longitudinal modes.

Embodiments of the present invention have the advantage that a substantially complete switching (e.g. >50 dB) with at least three distinct emission wavelengths of a multi-wavelength laser can be achieved. This can even be achieved for wavelength splitting below 80 nm and optionally above 80 nm, e.g. in the range of 1 to 10 nm, such as on an indium phosphide material platform. However, substantially complete switching can be achieved over a wide range of material platforms (i.e. for a wide range of different gain media) and for any wavelength separation between the emission wavelengths.

Embodiments of the present invention have the advantage that a good robustness against wavelength variations can be achieved, e.g. even though a device is designed for a given set of wavelengths, some robustness against wavelength variations can be achieved.

In a first aspect, the present invention relates to a photonic integrated circuit device comprising a lasing cavity for resonating at a plurality of discrete wavelengths and an optical feedback cavity (an external cavity) operably coupled to the lasing cavity via a front surface of the lasing cavity. The 'front surface' may generally refer to any type of optical coupling between the lasing cavity and the optical feedback cavity. The optical feedback cavity comprises a reflective element for reflecting light, at least partially, back into the lasing cavity such as to form a resonant cavity such as a resonant Fabry-Perot cavity between the front surface and the reflective element. The optical feedback cavity comprises a variable phase shifting element adapted for receiving an input signal to control a phase shift of light propagating in the optical feedback cavity. The variable phase shifting element does not require moving parts.

In a photonic integrated circuit device in accordance with embodiments of the present invention, the lasing cavity may comprise a gain medium for amplifying light by stimulated emission and optical feedback elements forming the lasing cavity around said gain medium.

In a photonic integrated circuit device in accordance with embodiments of the present invention, the optical feedback elements may comprise one or more distributed Bragg gratings and/or one or more multi-mode interference reflectors.

In a photonic integrated circuit device in accordance with embodiments of the present invention, the gain medium may comprise (or may be comprised in) a semiconductor laser diode.

In a photonic integrated circuit device in accordance with embodiments of the present invention, the optical feedback cavity may be a 'short cavity', i.e. configured and dimensioned in accordance with a short cavity regime.

In a photonic integrated circuit device in accordance with embodiments of the present invention, the photonic integrated circuit device may not include actuatable mechanical means.

In a photonic integrated circuit device in accordance with embodiments of the present invention, the optical feedback cavity need not comprise one or more spectrally selective elements (except for the wavelength selectivity due to the resonant Fabry-Perot cavity).

In a photonic integrated circuit device in accordance with embodiments of the present invention, the reflective element may be positioned relative to the front surface such that at least a subset of the plurality of discrete wavelengths of the light reflected back by the reflective element is not in phase, e.g. is out of phase at the position of the front surface.

In a photonic integrated circuit device in accordance with embodiments of the present invention, the reflective element may be positioned relative to the front surface such that, for a number n wavelengths of said plurality of discrete wavelengths, the relative phase difference $\Delta\Phi$ between light waves of further wavelengths such as consecutive wavelengths of said n wavelengths equals $2\pi/n$ without being limited to neighboring longitudinal modes (see FIG. 2). The relative phase difference relates to the light reflected back by the reflective element and refers to the phase difference at the position of the front surface. For example, if the laser emits at 1550, 1551, 1552 and 1553 nm, then the phase shifts should necessarily be 0, $2\pi/4$, $4\pi/4$, $6\pi/4$ in this order.

However, it is to be noted that in a photonic integrated circuit device in accordance with embodiments of the present invention, the relative phase differences $\Delta\Phi$ between further e.g. consecutive wavelengths are not necessarily well-distributed (i.e. uniformly distributed over $2\pi$). A relative phase difference relates to the light reflected back by the reflective element and refers to the phase difference at the position of the front surface.

While a larger separation, e.g. a phase difference as large as possible (e.g. $2\pi/n$), is preferable in order to achieve a good (or optimal) Fabry-Perot selectivity, smaller separations and/or non-uniformly distributed separations may equally achieve the desired effects as described in the advantages of the invention hereinabove. Therefore, embodiments are not necessarily limited as described in the previous paragraph hereinabove. Likewise, even if the relative phase difference is constrained as described in the previous paragraph hereinabove, it shall be clear to the skilled person that, in practice, a tolerance margin would apply, e.g. a relative phase difference may deviate up to, for example, 0.5 rad, e.g. up to 0.1 rad, e.g. up to 0.05 rad, e.g. up to 0.01 rad, or up to 0.001 rad, depending on the specific case, without substantially (negatively) affecting the result to be achieved.

In other words, the phase shift between wavelengths may be selected to be sufficiently large so that the differences in losses induced by the Fabry-Perot effect from the feedback cavity is sufficient to trigger switching, e.g. attenuation or extinction of one wavelength set and emission of another set, and vice versa (which may be extended to more than two sets). Thus, each wavelength set can be attenuated or fully suppressed or emitted by controlling the device, e.g. by controlling electronically. Thus, the difference in losses in the feedback cavity may typically overcome the gain difference experienced by the wavelengths in the laser cavity.

In a photonic integrated circuit device in accordance with embodiments of the present invention, the variable phase shifting element may be adapted for controlling (e.g. electronically) the phase shift of light propagating in the optical feedback cavity by adding a controllable phase shift to the light in response to the input signal.

In a photonic integrated circuit device in accordance with embodiments of the present invention, the controllable phase shift may cover at least a phase shift range of $2\pi \cdot (n-1)/n$, in which n is a number of wavelengths of said plurality of discrete wavelengths. However, embodiments are not necessarily limited thereto, as explained hereinabove.

In a photonic integrated circuit device in accordance with embodiments of the present invention, the variable phase shifting element may be adapted for, at least, causing the controllable phase shifts equal to $2 k\pi/n$, where $k=0, 1, \ldots, n-1$, for a corresponding plurality of values of the input signal. However, embodiments are not necessarily limited thereto, as explained hereinabove.

In a photonic integrated circuit device in accordance with embodiments of the present invention, the variable phase shifting element may be (or comprise) an Electro-Optical-Phase-Modulator.

In a photonic integrated circuit device in accordance with embodiments of the present invention the amount of light fed back to the lasing cavity from the feedback cavity is preferably low. The amount of light fed back should be low enough to prevent unstable, dynamical behavior. Preferably, the feedback cavity is only weakly coupled to the laser cavity so that there is a substantial attenuation that will limit the amount of light being sent back to the laser cavity so that it is below level which causes the onset of dynamical behavior, e.g. an attenuation of −20 dB to −40 dB or <−30 dB is preferred that can depend on the laser characteristics. Hence, there is an attenuation of the light being feedback into the lasing cavity. This results in an attenuation such as a significant attenuation or a suppression of one laser wavelength. Alternatively, or additionally this results in the boosting of another wavelength, or this results in attenuation such as a significant attenuation or a suppression of one laser wavelength and a boosting of the other wavelength such that partial or complete or substantially complete switching can be achieved. The present invention can be applied to any wavelength differences, well beyond neighboring longitudinal modes. The feedback time-delay is approximately set to an odd number of times the half beat notes between the one and the other wavelengths that can be emitted by the laser.

In a photonic integrated circuit device in accordance with embodiments of the present invention, the optical feedback cavity may further comprise an optical amplitude modulator to control the amount of light fed back to the lasing cavity from the feedback cavity in response to a further input signal. The optical amplitude modulator preferably comprises an attenuator. The attenuator can be active such as provided by a reversed bias amplifier functioning as an absorber or it can be passive such as a splitter in the feedback loop or a combination of a splitter and/or the use of a partially reflective mirror and/or high reflectivity of the laser front facet, low reflectivity of the feedback reflector.

A photonic integrated circuit device in accordance with embodiments of the present invention wherein the optical splitter is for separating a laser light output from the feedback cavity.

A photonic integrated circuit device in accordance with embodiments of the present invention may comprise a plurality of optical feedback cavities operably coupled to the lasing cavity, wherein said optical feedback cavities are operably arranged in a parallel configuration, each optical feedback cavity comprising a variable phase shifting element for receiving a corresponding input signal to control a phase shift of light propagating in said optical feedback cavity, wherein said optical feedback cavities have different lengths.

In a device in accordance with embodiments of the first aspect of the present invention, the photonic integrated circuit device may be based on an indium phosphide (InP) material platform.

In a device in accordance with embodiments of the first aspect of the present invention, the photonic integrated circuit device may be monolithically integrated. Monolithically integrated devices can have advantages over hybrids or free space designs as the implementation of these methods is not that straightforward as they need excellent coupling and don't have an attenuator.

Embodiments of the present invention provide a photonic integrated circuit device (1) comprising a lasing cavity (2) for resonating at a plurality of discrete wavelengths and an optical feedback cavity (3) operably coupled to the lasing cavity via a front surface (5) of the lasing cavity, wherein said optical feedback cavity comprises a reflective element (4) for reflecting light, at least partially, back into the lasing cavity (2) to form a resonant Fabry-Perot cavity between the front surface (5) and the reflective element (4), wherein said optical feedback cavity (3) comprises a variable phase shifting element (6) adapted for receiving an input signal (7) to control a phase shift of light propagating in the optical feedback cavity.

In a second aspect, the present invention relates to a method for switching the wavelength of the laser light output of a lasing cavity integrated on a photonic integrated circuit device, the lasing cavity being adapted for resonating at a plurality of discrete wavelengths. The method comprises coupling light out of the lasing cavity and into an optical feedback cavity on the photonic integrated circuit device, reflecting the light propagating in the optical feedback cavity and coupling the reflected light back into the lasing cavity, and controlling e.g. by controlling electronically) an input signal of a variable phase shifting element in the optical feedback cavity to control a phase shift of the light propagating in the optical feedback cavity.

In a method in accordance with embodiments of the present invention the amount of reflected light coupled into the lasing cavity from the feedback cavity is preferably low. The amount of light fed back and coupled into the lasing cavity should be low enough to prevent unstable, dynamical behavior of the laser. Preferably, the feedback cavity is only weakly coupled to the laser cavity so that there is a substantial attenuation that will limit the amount of light being sent back and coupled into to the laser so that it is below the level of reflected light coupled into the lasing cavity which is causes an onset of dynamical behavior, e.g. there should be an attenuation of −20 dB to −40 dB or <−30 dB e.g. depending on the laser characteristics. Hence, the photonic integrated circuit device is configured so that there is an attenuation of the light being feedback into the lasing cavity. This results in an attenuation such as a significant attenuation or a suppression of one laser wavelength. Alternatively, or additionally this results in the boosting of another laser wavelength, or this results in attenuation such as a significant attenuation or a suppression of one laser wavelength and a boosting of the other wavelength. This can result in a partial or complete or substantially complete switching.

Therefore, for at least a first value of the input signal, a first phase shift of the light coupled into the lasing cavity causes a first wavelength of said plurality of discrete wavelengths to be boosted with at least a factor of 10 dB, or up to 20 dB or up to 50 dB stronger than at least a second wavelength of said plurality of discrete wavelengths. For at least a second value of said input signal, a second phase shift of the light causes the second wavelength of said plurality of discrete wavelengths to be boosted by at least a factor of 10 dB or up to 20 dB or up to 50 dB stronger than at least the first wavelength of said plurality of discrete wavelengths. The first and second value are different values. The first and second phase shifts are different phase shifts. The first and second wavelengths are different wavelengths. The first and second wavelengths are not limited to neighboring longitudinal modes. The feedback time-delay is approximately set to an odd number of times the half beat notes between the first and second wavelengths that can be emitted by the laser.

Embodiments of the present invention provide a method for switching the laser light output wavelength of a lasing cavity (2) integrated on a photonic integrated circuit device, said lasing cavity being adapted for resonating at a plurality of discrete wavelengths, the method comprising:
  coupling light out of the lasing cavity (2) and into an optical feedback cavity (3) on the photonic integrated circuit device,
  reflecting said light propagating in the optical feedback cavity (3) and coupling the reflected light back into the lasing cavity (2),
  controlling an input signal (7) of a variable phase shifting element (6) in the optical feedback cavity (3) to control a phase shift of the light propagating in the optical feedback cavity,
  wherein for at least a first value of said input signal a first phase shift of the light causes a first wavelength of said plurality of discrete wavelengths to be at least a factor of 10 dB stronger than at least a second wavelength of said plurality of discrete wavelengths,
  wherein for at least a second value of said input signal a second phase shift of the light causes the second wavelength of said plurality of discrete wavelengths to be at least a factor of 10 dB stronger than at least the first wavelength of said plurality of discrete wavelengths.

The optical feedback cavity may further comprise an optical amplitude modulator to control the amount of light fed back to the lasing cavity from the feedback cavity in response to a further input signal. The optical amplitude modulator preferably comprises a means for attenuation. The means for attenuation can be an attenuator that can be active such as provided by a reversed bias amplifier functioning as an absorber or it can be passive such as a splitter in the feedback loop or a combination of a splitter and/or the use of a partially reflective mirror and/or high reflectivity of the laser front facet, low reflectivity of the feedback reflector. The optical splitter is for separating a laser light output from the feedback cavity.

A photonic integrated circuit device in accordance with embodiments of the present invention can comprise a plurality of optical feedback cavities operably coupled to the lasing cavity, wherein said optical feedback cavities are operably arranged in a parallel configuration, each optical feedback cavity comprising a variable phase shifting element for receiving a corresponding input signal to control a phase shift of light propagating in said optical feedback cavity, wherein said optical feedback cavities have different lengths.

In a further aspect, the present invention relates to the use of a device in accordance with embodiments to switch between a plurality of output laser wavelengths for different communication channels in telecommunication, e.g. in Wavelength Division Multiplexing (WDM). It is an advantage of embodiments of the present invention wavelength separation can be obtained independently of the spectral separation between the wavelengths emitted by the laser. The present invention can be applied to any wavelength differences, well beyond neighboring longitudinal modes. There present invention can relate to multi-wavelength lasers whose wavelengths are not neighboring longitudinal modes.

The feedback time-delay is approximately set to an odd number of times the half beat notes between the different wavelengths that can be emitted by the laser In a further aspect, the present invention relates to the use of a device in accordance with embodiments to generate a terahertz (THz) signal for use in medical or dental imaging, non-destructive testing (e.g. concrete or building inspection), and/or spectroscopy.

Aspects of embodiments of the present invention include one some or all of:
  External cavity length set at a certain length, i.e. an odd number of times the half beat note between the different wavelength pairs. The length of the external cavity is selected to ensure that different modes supported by the laser are not in phase after propagating through the external cavity or that at least two subsets of supported modes exhibit a relative phase difference after the propagation in the external cavity.

If more than 2 wavelengths (i.e. a wavelength pair) are used a compromise is made between all wavelength pairs. For example a minimized the error with respect to the ideal length for each wavelength pair is selected. For example this can give a $2\pi/n$ phase separation for a set of n wavelengths regularly spaced.

Feedback strength from the optical feedback cavity is weak, e.g. about 0.1% or lower and not above 1% of the total amount of light emitted from all laser outputs returns to the lasing cavity. This low level is to ensure stability of the laser. The external cavity is configured to induce a sufficiently large gain difference between any two modes. To achieve this a phase difference between the modes is required so they will experience a different effect of the external cavity. This can be set by the external cavity length, A sufficiently good selectivity i.e. finesse of the external cavity spectral response is fixed by the optical feedback strength, i.e. how much light is sent back to the laser. Further a tuning mechanism is provided to adjust the spectral response of the cavity to select one mode in particular. A phase modulator can be used to achieve this.

Feedback strength can be adjusted actively, e.g. via a semiconductor optical amplifier which can be reversed bias for attenuation or forward biased for amplification or adjusted passively by design using e.g. a custom splitter or partially reflecting mirror.

Fast switching speed ensured by:
  a physical mechanism of phase control,
  the weak feedback regime means gentle boost or gentle attenuation of the different wavelengths.

The multi-wavelength laser only allows selectable wavelengths.

Operating the laser close to the simultaneous emission point allows both modes to be readily accessible.

Optionally modulation of the phase modulator can be provided e.g. If regular switching between wavelengths is required, Aspects preferably not present in embodiments of the present invention include one, some or all of:

Only having one cavity per wavelength, and/or one control parameter per cavity.

Having direct coupling between cavities, such as an anti-reflective coating on intracavity surface to achieve strong feedback as known from an extended cavity regime.

Having only a single mode laser rather than a dual mode or multimode laser.

Not having a specific external cavity length.

Being limited to selection between neighboring longitudinal modes.

BRIEF DESCRIPTION OF THE DRAWINGS

FIG. 2 shows peaks in the free spectral range. The x-axis is the wavelength from 0% to 100%. The y-axis on the lefthand side if FP transmission from 0% to 100%. The y-axis on the righthand side is Reflection Rc from 100% to 0%.

DEFINITIONS

Figure 1:
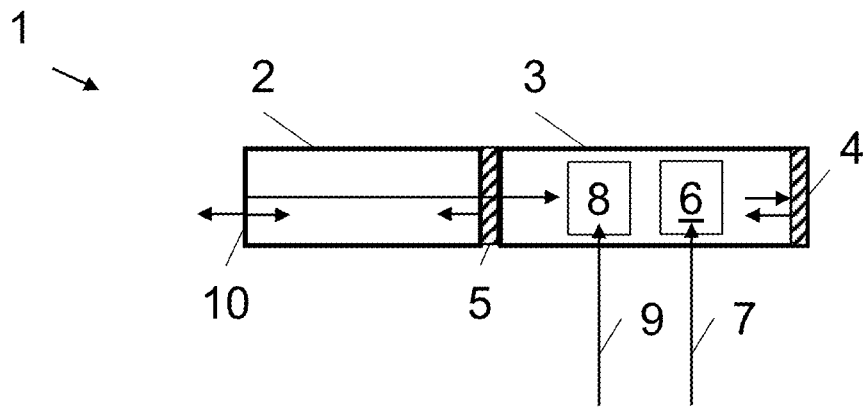
FIG. 1 illustrates a photonic integrated circuit device in accordance with embodiments of the present invention.

Tunable Lasers Such as Discreetly Tunable Lasers Differ from Multi-Wavelength Lasers A tunable laser is a single-mode laser whose emissive wavelength can be tuned e.g. discreetly tuned, to different values A multi-mode tunable laser is an option in embodiments of the present invention although usually less preferred. In such a case, additional modes would be neighboring longitudinal modes.

A multi-wavelength laser can intrinsically have the capability to simultaneously emit coherent light at different wavelengths although not limited to neighboring longitudinal modes as in a Fabry Perot laser. These lasers can emit these wavelengths without being coupled to the external cavity (e.g. an optical feedback cavity). Preferably, the laser itself—without the external cavity—is designed to emit at a set (e.g. >1) of wavelengths.

A Photonic Integrated Circuit

A photonic integrated circuit or PIC is a device that has at least two distinct functional sections, with an optical waveguide junction therebetween. A photonic integrated circuit device may be based on an InP material platform or a Si or SiN material platform or a PIC can be made using heterogenous integration such as using an InP on silicon system.

Short Cavity, i.e. Configured and Dimensioned in Accordance with a Short Cavity Regime Where reference is made to a short cavity, or the short cavity regime, this refers to a case in which the resonance frequency of the feedback cavity, i.e. the inverse of the round-trip (back-and-forth) propagation time of the laser light inside the feedback cavity, is greater than the relaxation oscillation frequency of the lasing cavity. Thus, the feedback can quickly adapt to changes of the light quality received from the lasing cavity in a time scale that is smaller than the time scale on which changes in the light quality, e.g. the amplitude, typically occur during stabilization of the laser output. While these quantities relate to a functional definition in terms of the operating characteristics, it is to be noted that this relationship can be directly and unambiguously verified when examining a device as described. For example, the round-trip propagation time, and, hence, the resonance frequency, can be experimentally determined or inferred from the optical characteristics of the medium in the feedback cavity (possibly taking optical components into account). The relaxation oscillation frequency can also be experimentally determined or inferred from simulation of the lasing cavity design. The reference to "greater than" hereinabove includes equal to or greater than, e.g. to equal to or greater than, or to at least two times greater than, e.g. to at least four times greater than, e.g. to at least ten times greater than; in other words, to about equal to or preferably (substantially or sufficiently) greater than. It is also to be noted that an equivalent definition in terms of the round-trip propagation time of the feedback cavity being "less than" the corresponding relaxation oscillation period of the lasing cavity can be formulated, as would be evident to the skilled person.

Extended Cavity Regime

An extended cavity regime relates to a laser that lases when a laser cavity is combined with a further external cavity with typically an intracavity anti-reflection facet. An extended cavity regime is when the laser cavity is so strongly coupled to an external cavity, that the laser behaves as if the external cavity was part of its internal one. There is a strong coupling between the external cavity and the lasing cavity: more than 10% of the total amount of light generated by the laser is sent back into the laser cavity from the external cavity. The coupling is sufficiently strong for the laser to behave as if the external cavity was an extension of the lasing cavity.

Laser Stability

A laser is said to be stable if the characteristics of the generated optical beam, e.g. optical spectrum, optical output power, mode profile, wavelength, remains constant over time except for natural variations induced by noise, e.g. spontaneous emission noise.

A laser should be stable, if the distance of rays subject to optical oscillations from their optical axis remains constant and does not increase in size until the rays extend beyond optical elements such as lenses or facets.

External Cavity

As used in the present application an external cavity is an optical feedback cavity operably coupled to the lasing cavity.

Switching Time

Switching time between wavelengths is the time between the moment the control signal edge reaches the actuator and the moment the mode being turned off has an optical power less than 10% of its initial optical power and the mode being turned on has an optical power above 90% of the stable output power it reaches in the longer term.

Neighboring Longitudinal Modes

Neighboring longitudinal modes can be defined as the next or adjacent, wavelength i.e. with a wavelength just above or below the current one. Longitudinal modes are allowed in the lasing cavity not taking into account wavelength filtering effects e.g. from DBR's but only the Fabry-Perot effect inside the lasing cavity. Embodiments of the present invention are not limited to only neighboring modes but allow wavelengths with a greater separation than the separation between neighboring longitudinal modes. In any or all embodiments it is not necessary to go through neighboring longitudinal mode when gradually changing the phase in their external cavity. In multiwavelength devices according to embodiments of the present invention it is possible to skip a number of longitudinal modes even if the control signal is changed gradually.

Detailed Description of the Invention

The present invention relates in a first aspect to a photonic integrated circuit device comprising a lasing cavity adapted for resonating at a plurality of discrete wavelengths and an optical feedback cavity operably coupled to the lasing cavity. The lasing cavity can operate as a laser without the optical feedback cavity, i.e. the lasing cavity is a multiwavelength laser such as a dual wavelength laser. The feedback cavity comprises a variable phase shifting element. The variable phase shifting element is adapted for receiving an input signal to control a phase shift of light propagating in the optical feedback cavity.

Referring to FIG. 1, an exemplary photonic integrated circuit device 1 is shown. As known in the art, such a photonic integrated circuit device may integrate a plurality of optically active and/or passive functions on a single chip. A photonic integrated circuit (PIC) is a device that has at least two distinct functional sections, with an optical waveguide junction therebetween. For any of the embodiments the photonic integrated circuit device may be based on an InP material platform. Clearly, other material platforms suitable for photonic circuit integration are not excluded. In particular, for any of the embodiments, the photonic integrated circuit device can be made using a Si or SiN material platform or heterogenous integration such as with an InP on silicon system.

The photonic integrated circuit device 1 may be monolithically integrated, i.e. the lasing cavity and the optical feedback cavity may be monolithically integrated on the photonic integrated circuit device. This has the advantage of providing a high-performance device. Furthermore, difficulties in operably coupling the optical feedback cavity as an external cavity to the lasing cavity after manufacture of the lasing cavity can thus be avoided. Monolithically integrated devices can have advantages over hybrids or free space designs as the implementation of these methods is not that straightforward as they need excellent coupling and they don't have an attenuator Preferably, the photonic integrated circuit device 1 does not include (or depend on, insofar operation according to the described embodiments is concerned) actuatable mechanical means, e.g. a MEMS structure. Instead, the control, driving and tuning is performed electronically. This has the advantage that costs can be kept low, and undesirable influences of external factors, such as vibrations, noise, temperature, pressure and such are reduced. This has the further advantage that faults due to mechanical failure can be reduced or avoided.

The photonic integrated circuit device 1 comprises a lasing cavity 2, i.e. a lasing resonator, adapted for resonating at a plurality of discrete wavelengths. Thus, the lasing cavity forms a multi-wavelength laser capable of emitting coherent light at different wavelengths without the need for an external optical feedback cavity. As is well-known in the art, the lasing cavity is adapted for providing optical amplification, i.e. a process of optical oscillation, by stimulated emission of electromagnetic radiation, e.g. generally in the range of optical radiation, e.g. having wavelengths in the 100 nm to 1 mm range, for example in the visible range, the ultraviolet range and/or the infrared range. As is also well-known, the light produced by the optical amplification process can be characterized by its spatial coherence. The laser should be stable, i.e. the distance of rays subject to optical oscillations from their optical axis should remain constant and not increase in size until the rays extend beyond optical elements such as lenses or facets.

Figure 6:
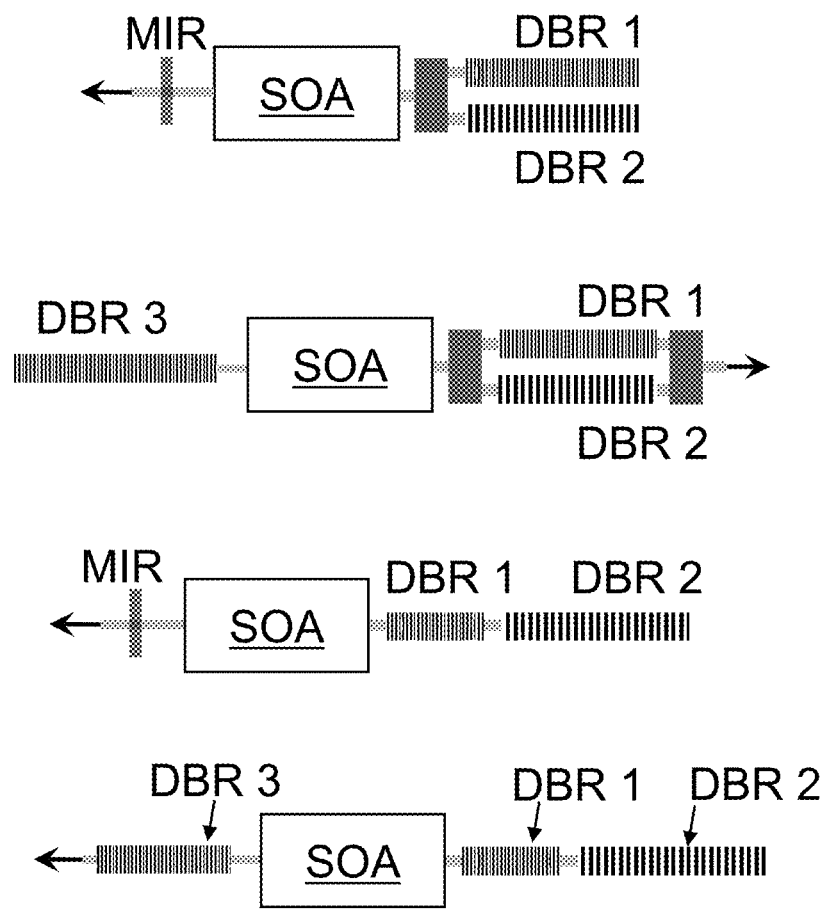
FIG. 6 illustrates different configurations for implementing a semiconductor lasing cavity in accordance with embodiments of the present invention.
Figure 7:
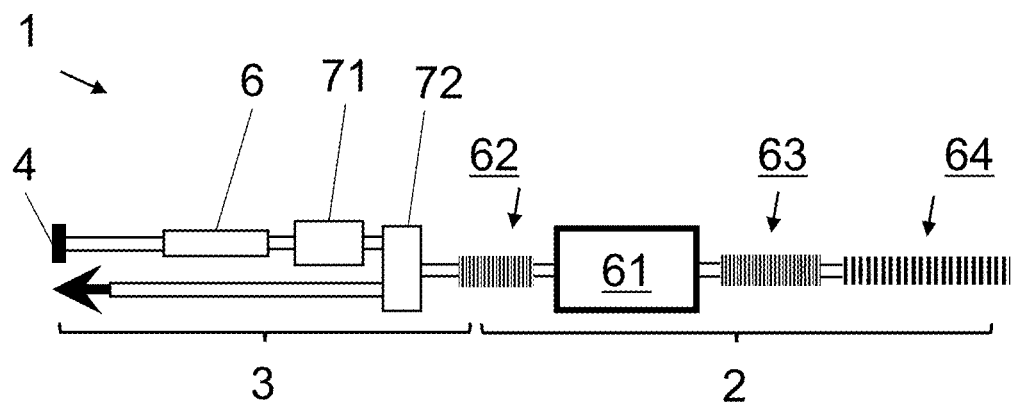
FIG. 7 illustrates an exemplary photonic integrated circuit device in accordance with embodiments of the present invention.

Referring to FIG. 7, the lasing cavity 2 may typically comprise a gain medium 61, an energizer, i.e. means for energizing the gain medium 61, and an optical feedback element(s) 62,63,64. The gain medium is adapted to amplify light by stimulated emission, i.e. light passing through the gain medium is increased in power by the amplification process, drawing power from the energizer, which supplies energy to the gain medium, i.e. is being 'pumped'. The energizer may supply this power in the form of an electric current or as light, e.g. a pump light source. The optical feedback element may comprise two or more reflective elements on either end of the lasing cavity, e.g. in between which the gain medium is located. This optical feedback element may be inherent to the structure of the lasing cavity, e.g. the ends of a crystal may be cleaved to form smooth reflective facets, or may comprise separately identifiable components. The lasing cavity, i.e. the optical feedback element(s) thereof, may comprise Distributed Bragg Gratings (e.g. DBR1, DBR2, DBR3 in FIG. 6). Light is repeatedly reflected between these reflective elements and each time it passes through the gain medium amplified. At least one of the reflective elements, further referred to as the front surface 5 or front facet, may be partially transparent to allow some light to pass through in both directions. Thus, light can be coupled between the lasing cavity and the optical feedback cavity through the front surface. Optionally, also a second reflective element 10, e.g. at the other end of the lasing cavity relative to the front surface 5, can be partially transparent to allow some light to pass through, e.g. to provide an output laser light signal. The front surface 5 or front facet preferably couples 70% or less light from the lasing cavity to the external optical feedback cavity and couples 70% or less light from the optical feedback cavity to the lasing cavity. For a reflectivity of laser facets of 30% for discrete devices (air/semiconductor interface) transmission is 70%.

In PICs, depending on the component, reflectivity can be from 30-40% (e.g. for multimode interference reflectors) to 99% (e.g. for Bragg Reflectors) so transmission is 60-70 down to 1%.

The lasing cavity 2 may be (or may be comprised in) a semiconductor laser, e.g. a laser diode. For example, the gain medium and/or energizer may comprise (or be comprised in) a laser diode. The lasing cavity 2 may comprise a semiconductor optical amplifier SOA, i.e. a semiconductor material or construct adapted to amplify an optical signal, i.e. light, directly (e.g. without intermediate conversion to another modality, such as an electrical signal). For example, such semiconductor optical amplifiers may comprise group III-V compound semiconductors, e.g. GaAs/AlGaAs, InP/InGaAs, InP/InGaAsP and InP/InAlGaAs, or direct band gap semiconductors, e.g. group II-VI.

The photonic integrated device may comprise a conventional (i.e. edge-emitting) semiconductor laser diode, though other variants, such as vertical cavity (optionally external-cavity) surface-emitting lasers and/or nanowire lasers are not necessarily excluded. The lasing cavity 2 may be (or may be comprised in) a double heterostructure laser, and/or a quantum well laser, and/or a quantum cascade laser, and/or a quantum dot laser and/or an interband cascade laser. In a preferred embodiment, the lasing cavity 2 may be (or may be comprised in) a distributed Bragg reflector laser.

As known in the art, a multi-mode semiconductor laser device can be obtained by including a plurality of distributed Bragg reflectors DBR1, DBR2, DBR3 of different spatial periodicity, which may be arranged in series or in parallel. Some exemplary configurations are shown in FIG. 6.

In these examples, a semiconductor optical amplifier SOA provides the gain of the laser, and a pair of distributed Bragg gratings (DBR1, DBR2) with a narrow bandwidth is used to select two wavelengths. This can be generalized to more wavelengths by including further distributed Bragg Gratings). These exemplary two gratings are placed either in a parallel configuration, e.g. using a splitter, or in a series configuration, e.g. in a row along the optical axis. The parallel structure has the advantage of creating a symmetrical system, which makes the design easier, since it's easier to integrate gratings of some considerable length. However, since each grating is transparent for the other wavelength (i.e. selected by the other grating), losses can be relatively high, since each DBR also implies losses. Placing the gratings in series can be more challenging, since the two gratings potentially resonate with each other. The lasing cavity is furthermore of different length, as perceived for each wavelength. Thus, to achieve single mode emission, the first grating needs to be sufficiently short, but should also provide a sufficient reflection of its selected component, thus leading to a trade-off for optimization in design.

The exemplary pair of Bragg gratings is either complemented (i.e. arranged on the side of the semiconductor optical amplifier SOA that is opposite of the side where the pair of Bragg gratings DBR1, DBR2 is arranged, along the optical axis) by a broadband Multi-mode interference reflector MIR or with a further distributed Bragg grating DBR3. The MIR may be adapted for reflecting light of any wavelength in the range of interest (e.g. 1500 to 1580 nm, not necessarily limited thereto). The alternative of the further distributed Bragg grating DBR3 typically has a narrower reflected bandwidth, and may be adapted, in design, so that the narrow-bandwidth regions reflected by the pair of Bragg gratings DBR1, DBR2 lies within the reflection bandwidth of the further distributed Bragg grating DBR3. Even though this design may involve an increased complexity, all distributed Bragg gratings may be slightly tuned to counterbalance potential manufacturing defects.

Even though reference is made to a 'front surface' (or front facet) of the lasing cavity, embodiments in which light is coupled into and out of the lasing cavity by a coupler that does not form a facet or surface of the lasing cavity are not necessarily excluded. For example, the lasing cavity may comprise a ring laser cavity, and the 'front surface' may refer equally to a coupler for coupling light at least partially and preferably partially, e.g. 60% of the light or less, into and out of the ring structure.

The photonic integrated circuit device 1 comprises an optical feedback cavity 3 operably coupled to the lasing cavity, e.g. together with the lasing cavity forming an external cavity.

The optical feedback cavity 3 may be considered as forming an optical filter. The optical feedback cavity 3 may be a short cavity. Likewise, the external cavity formed by the optical feedback cavity and the lasing cavity can be relatively short. Thus, operation can be achieved in what is known as the short cavity regime, and dynamical instabilities can be reduced or avoided. Moreover, the response time of the system is significantly reduced.

Where reference is made to a short cavity, or the short cavity regime, this refers to a case in which the resonance frequency of the feedback cavity, i.e. the inverse of the round-trip (back-and-forth) propagation time of the laser light inside the optical feedback cavity, is greater than the relaxation oscillation frequency of the lasing cavity. Thus, the feedback can quickly adapt to changes of the light quality received from the lasing cavity in a time scale that is smaller than the time scale on which changes in the light quality, e.g. the amplitude, typically occur during stabilization of the laser output. While these quantities relate to a functional definition in terms of the operating characteristics, it is to be noted that this relationship can be directly and unambiguously verified when examining a device as described. For example, the round-trip propagation time, and, hence, the resonance frequency, can be experimentally determined or inferred from the optical characteristics of the medium in the feedback cavity (possibly taking optical components into account). The relaxation oscillation frequency can also be experimentally determined or inferred from simulation of the lasing cavity design. The reference to "greater than" hereinabove may refer to about equal to or greater than, e.g. to equal to or greater than, or to at least two times greater than, e.g. to at least four times greater than, e.g. to at least ten times greater than; in other words, to about equal to or preferably (substantially or sufficiently) greater than. It is also to be noted that an equivalent definition in terms of the round-trip propagation time of the feedback cavity being "less than" the corresponding relaxation oscillation time of the lasing cavity can be formulated, as would be evident to the skilled person.

The optical feedback cavity may further comprise an optical amplitude modulator to control the amount of light fed back to the lasing cavity from the optical feedback cavity; e.g. in response to an input signal. The optical amplitude modulator preferably comprises a means for attenuation. The means for attenuation can be an attenuator 8 optionally electronically controllable or controlled by a signal 9. The attenuator 8 can be active such as provided by a reversed bias amplifier functioning as an absorber or it can be passive such as a splitter in the feedback loop or a combination of a splitter and/or the use of a partially reflective mirror and/or high reflectivity of the laser front facet, low reflectivity of the feedback reflector. The optical splitter is for separating a laser light output from the feedback cavity.

Figure 2:
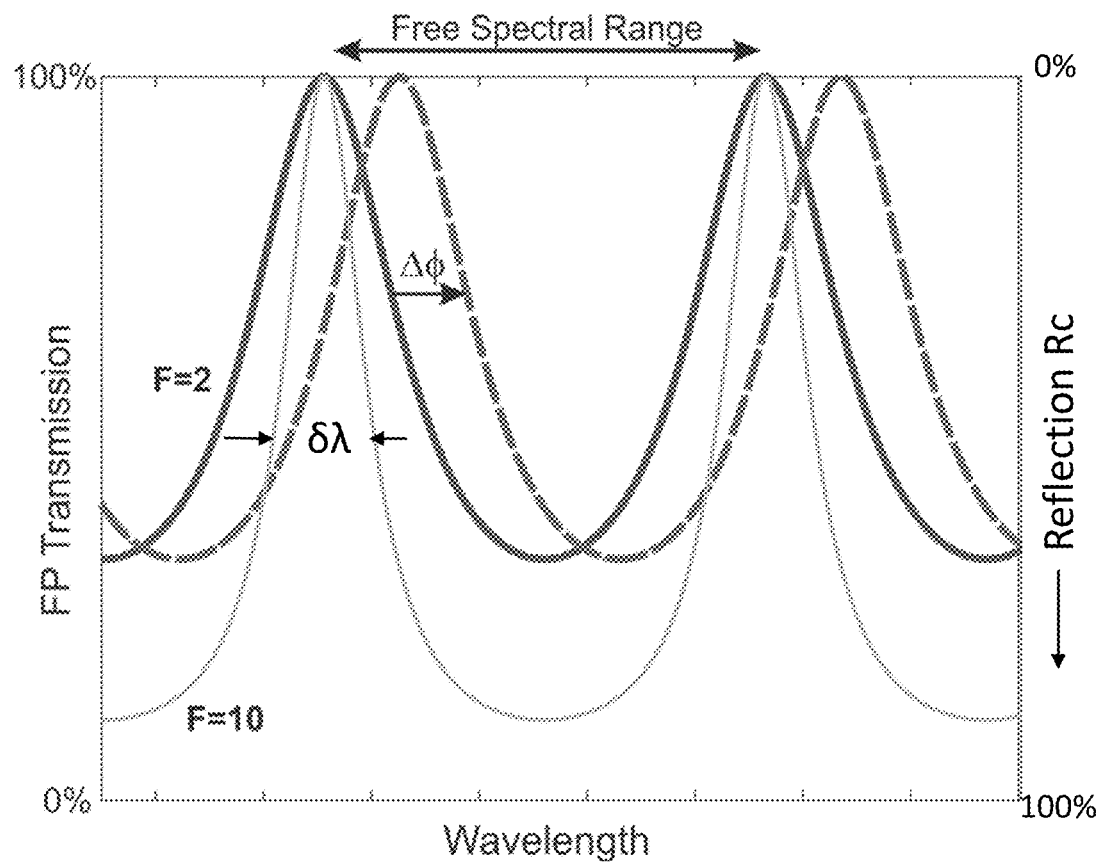
FIG. 2 shows the influence of the Finesse factor and the travel time on transmission as function of wavelength in a Fabry-Perot resonator, to illustrate embodiments of the present invention.

The optical feedback cavity comprises a reflective element 4, such as a mirror or reflector, for reflecting light, at least partially, back into the lasing cavity to form a resonant Fabry-Perot cavity between a front surface (front facet) 5 of the lasing cavity and the reflective element 4. An attenuator 8, optionally electronically controllable or controlled by signal 9, in the optical feedback cavity is preferably configured to control the amount of light fed back into the lasing cavity in order to maintain a stable laser operation. Although there are no spectrally selective elements in the feedback cavity (without embodiments necessarily being limited thereto), the latter can act as a Fabry-Perot resonator whose response is wavelength dependent, as shown in FIG. 2. The position of the reflective element relative to the front facet of the lasing cavity may be such that the different wavelengths emitted by the laser are not in phase or out-of-phase, and therefore not resonating together in the cavity.

While a round trip-time $\Delta\tau$, corresponding to the length of the feedback cavity, defines the spacing between two resonant peaks $\Delta\lambda$, the wavelength selectivity, expressed by the Finesse $F=\Delta\lambda/\delta\lambda$, is defined by the quality factor of the cavity and is therefore directly influenced by the reflectivity R of the reflective element. FIG. 2 shows a typical response of a Fabry-Perot resonator for two different finesses $F=2$ and $F=10$, showing transmission peaks at resonant frequencies.

Because not all wavelengths resonate in the cavity, the resonant ones will see a relative loss reduction while antiresonant wavelength will experience a relative increase of their losses. The strength of this forcing is dependent on the wavelength selectivity of the cavity. By a careful design of the feedback cavity parameters, taking into account the wavelengths of the lasing cavity, only a selected subset of the wavelengths emitted by the laser can resonate simultaneously in the Fabry-Perot resonator. This design can furthermore ensure that the forcing is strong enough to create a significant imbalance between the different wavelengths in the laser. Such design practices are considered to lie well within the capabilities of the skilled person, i.e. requiring only routine simulations and/or straightforward experimentation to arrive at a suitable design.

The reflective element 4 feeds a portion and preferably only a portion of the light back into the lasing cavity, with a specific delay, thus forming a Fabry-Perot resonator between the front facet of the laser and the reflective element. When an attenuator optionally controllable or controlled electronically by a signal 9 is included in the optical feedback cavity, the reflective elements can reflect part/a portion of the light from the laser or all as the attenuation of the light is carried out by the attenuator 8.

Figure 3:
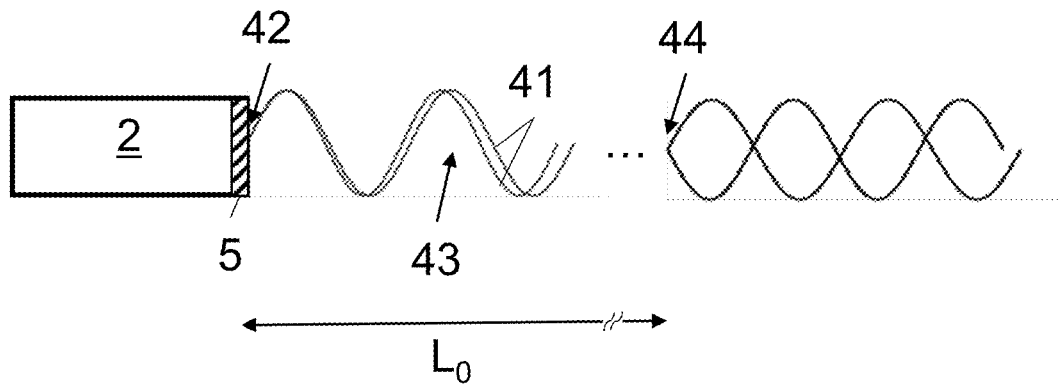
FIG. 3 shows the evolution in space (and time) of a phase difference between light of two different wavelengths, to illustrate embodiments of the present invention.

The specific length of this Fabry-Perot resonator can be designed such that the wavelengths (or at least the wavelengths of interest for the specific application) that are supported by the lasing cavity are out-of-phase, i.e. not in phase and are not resonating together in the lasing cavity. Referring to FIG. 3, for example, two wavelengths 41 (of interest) amplified by the lasing cavity, e.g. a dual-mode laser, may be shifted over a relative phase shift of $\pi$ between the two emitting wavelengths. If the laser emits on two different wavelengths with no relative phase shift of $\Delta\Phi=0$, at the coupling 42 provided through the front surface 5, this relative phase shift will change 43 when evolving into the feedback cavity due to the differing frequencies. This evolution can lead to a predetermined relative phase shift at 44, e.g. of $\Delta\Phi=\pi$, after a predetermined length $L_O$.

Figure 4:
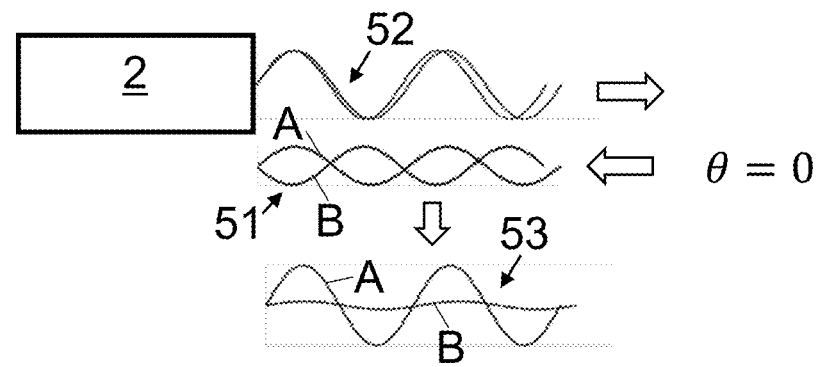
FIG. 4 illustrates the selection of two different wavelengths by tuning a feedback cavity length and additional phase difference, to illustrate embodiments of the present invention.
Figure 4:
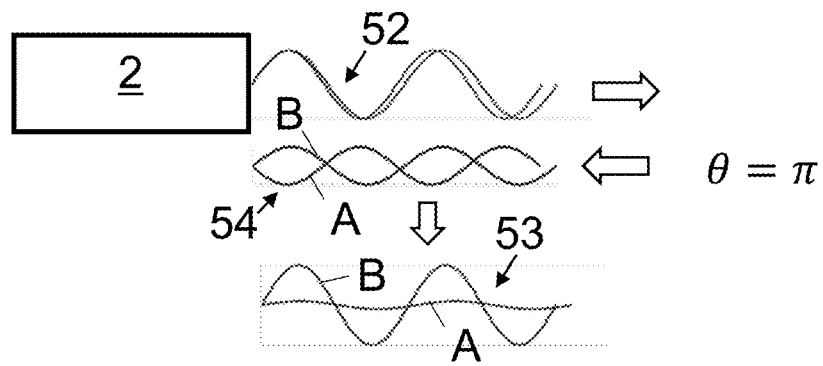

Referring to FIG. 4, if the reflective element were to be placed at half of this length $L=L_O/2$, the reflected light 51 enters the lasing cavity with a $\pi$ relative phase shift. Superposition 53 of the reflected wave 51 on the forward propagating wave 52 inside the laser cavity, one mode A will resonate and be boosted. At the same time or independently the other mode B can or will be attenuated and even suppressed. The attenuation can be at least 10 dB or 20 dB or up to 50 dB. To switch the emission to the second mode B, a phase shift of $\theta=\pi$ can be provided by fine-delay tuning using a variable phase shifting element 6, e.g. a controllable phase modulator, thus causing the reflected wave 54 to be shifted over π in phase. Referring to the difference between phase Φ for each wave as such, this may correspond to a relatively short delay in time and distance in space, and the relative phase difference ΔΦ between both waves, may correspond to relatively longer intervals in time and distances in spaces, i.e. particularly when the wavelengths are relatively close to each other. Tuning θ, electronically by controlling an input signal 7 of the variable phase shifting element 6, results in a change of the emission in favor of the second mode B while the first mode A is attenuated or even suppressed. The attenuation can be at least 10 dB or 20 dB or up to 50 dB. As the length of the cavity only changes by θ, the relative phase shift ΔΦ changes only marginally.

This approach can also be used to achieve an equal power point (or more generally, in principle any desired power ratio of) of both modes when finely adjusted to a corresponding value between θ=[0,π]. For example, a first phase shift of the light, corresponding to the action of the variable phase shifting element, causes a first wavelength of the plurality of discrete wavelengths to be at least a factor of 10 dB, e.g. at least 20 dB, such as up to or at least 50 dB stronger than at least a second wavelength of a plurality of discrete wavelengths. For at least, a second phase shift, corresponding to the action of the variable phase shifting element of the light, causes the second wavelength of the plurality of discrete wavelengths to be at least a factor of 10 dB stronger, e.g. at least 20 dB, e.g. up to or at least 50 dB, than at least the first wavelength of the plurality of discrete wavelengths.

Furthermore, this control technique does not depend on the initial phase shift $\Phi_0$ (where the light enters the feedback cavity at the front surface 5) and is for simplicity reasons chosen to be 0 in these illustrations. The length of the feedback cavity can be chosen to be such that the required relative phase shift ΔΦ occurs, and a random initial phase shift $\Phi_0$ does not affect this condition and is therefore negligible. In addition, this principle can be generalized for n wavelengths, in which the relative phase shifts of the involved modes can, for example, be equally spaced by ΔΦ=2π/n. While substantially complete suppression of one wave in favor of another wave can be achieved for two wavelengths, it shall be clear that an attenuation e.g. a useful suppression of the one wave in favor of another wave applies equally well to a plurality of other modes, without necessarily completely suppressing all of these other modes, when a single mode is enhanced e.g. maximally enhanced by constructive interference.

The round trip-time Δτ, corresponding to the time of light travel over the length of the optical feedback cavity, i.e. the position of the reflective element with respect to the front surface of the lasing cavity, defines the spectral periodicity of the Fabry-Perot response. The feedback cavity length may therefore be specifically adapted so that all wavelengths of a selected subset of the lasing cavity wavelengths can be resonant simultaneously, while all the others are non-resonant. Generally, the optical feedback cavity can be tuned to target different wavelength subsets, i.e. to achieve the strongest forcing and maximal selectivity. Of course, as there is only a single feedback cavity, it's parameters can be optimized, in a straightforward manner, to provide a compromise between the requirements for each selectable wavelength and/or each subset of simultaneously selectable wavelengths that are intended to be controllably selected in accordance with a reduction to practice of the present invention in a particular application.

The reflectivity of the reflective element 4, e.g. a reflector or mirror, defines the finesse of the Fabry-Perot cavity. It quantifies the frequency selectivity of the feedback cavity. A high finesse will allow a much stronger forcing and thus induction of stronger changes in the laser emission. However, the feedback strength, i.e. the amount of light sent back to the laser after a full round trip, is not only determined by this reflectivity, but may also depend on other possible losses, such as due to optional components such as splitter(s), amplifier(s), attenuator(s) and/or waveguide losses.

It is well known in the field that beyond a certain feedback strength the laser will be destabilized and will start exhibiting dynamical behavior. The threshold corresponds to the so-called Hopf bifurcation point at which the relaxation oscillations of the laser becomes undamped and the laser output power starts oscillating. To maintain a stable operation of the laser it is therefore required to keep the feedback strength below the said threshold, below the onset of dynamical behaviour. As a result, the reflectivity of the reflective elements (and/or the influence of other components in the feedback cavity on the feedback strength) is preferably selected or optimized (e.g. by use of an active or passive attenuator 8 optionally electronically controlled or controllable by a signal 9) to prevent the triggering of such instabilities in the multi-color laser in normal operation of the device. Such considerations lie, as already mentioned hereinabove, within the capabilities of the skilled person in designing a laser system. However, it is an advantage of a short feedback cavity, i.e. operating in the short cavity regime, that the feedback strength threshold corresponding to the onset of dynamical behavior is increased compared to the long cavity regime. Thus, with a short cavity, the laser can be substantially more robust against delayed feedback, thus preventing and/or alleviating potential instabilities.

Since optical feedback can have undesirable effects, such as destabilizing the laser, e.g. up to the point that it generates complex chaotic behavior, the reflectivity of the reflective elements and/or the influence of other components in the feedback cavity on the feedback strength is preferably selected or optimized such that it prevents the triggering of such instabilities in the multi-color laser in normal operation of the device. Such considerations lie, as already mentioned hereinabove, within the capabilities of the skilled person in designing a laser system. However, it is an advantage of a short feedback cavity, i.e. operating in the short cavity regime, that the laser can be substantially more robust against delayed feedback, thus preventing and/or alleviating potential instabilities.

The optical feedback cavity 3 comprises a variable phase shifting element 6, operating as a controllable phase modulator, i.e. a controllable phase shifting element located in the feedback cavity. This variable phase shifting element 6 is adapted for receiving an input signal, e.g. an electrical signal, such as a voltage or current, to control a phase shift of light travelling in the feedback cavity. The control is electronic requiring no moving parts. By design, multi-wavelength lasers have the capability to emit at different wavelengths. To change the output power of these different wavelengths, one may need to selectively vary the gain and/or losses of each wavelength. More gain or less losses means a higher output power. Inversely less gain or more losses means a lower output power. To pilot the emission of the lasing cavity capable of emitting at the plurality of different discrete wavelengths, the phase shifting element 6 in the optical feedback cavity can be controlled (e.g. electronically) to select one or more wavelengths. Thus, this underlying forcing mechanism selectively controls the different wavelengths of a multi-wavelength laser. This phase modulator inside the feedback cavity such as variable phase shifting element 6, allows to shift the response of the Fabry-Perot resonator, formed by the optical feedback cavity, in wavelength, and thus gives the ability to change the resonating wavelength or wavelengths. The phase modulator such as the variable phase shifting element 6 may be an Electro-Optical-Phase-Modulator (EOPM). The variable phase shifting element 6 may be adapted for, at least, causing a first phase shift when receiving a first value of the input signal and causing a second phase shift, different from the first phase shift, when receiving a second value, different from the first value, of the input signal. The difference between the first phase shift and the second phase shift may be about equal to $\pi$, e.g. may be equal to $\pi$. Particularly, for selecting between two wavelengths of a dual-mode laser, this difference may be equal to $\pi$. Furthermore, and without limitation, for a lasing cavity adapted for generating (amplifying) at least n>2 (substantially) different wavelengths (ignoring, obviously, the wavelengths that would form a single peak by natural spreading), the variable phase shifting element 6 may be adapted for generating a corresponding plurality of different phase shifts, which may be uniformly distributed over $2\pi$, e.g. at $2\pi/n$ intervals.

Figure 8:
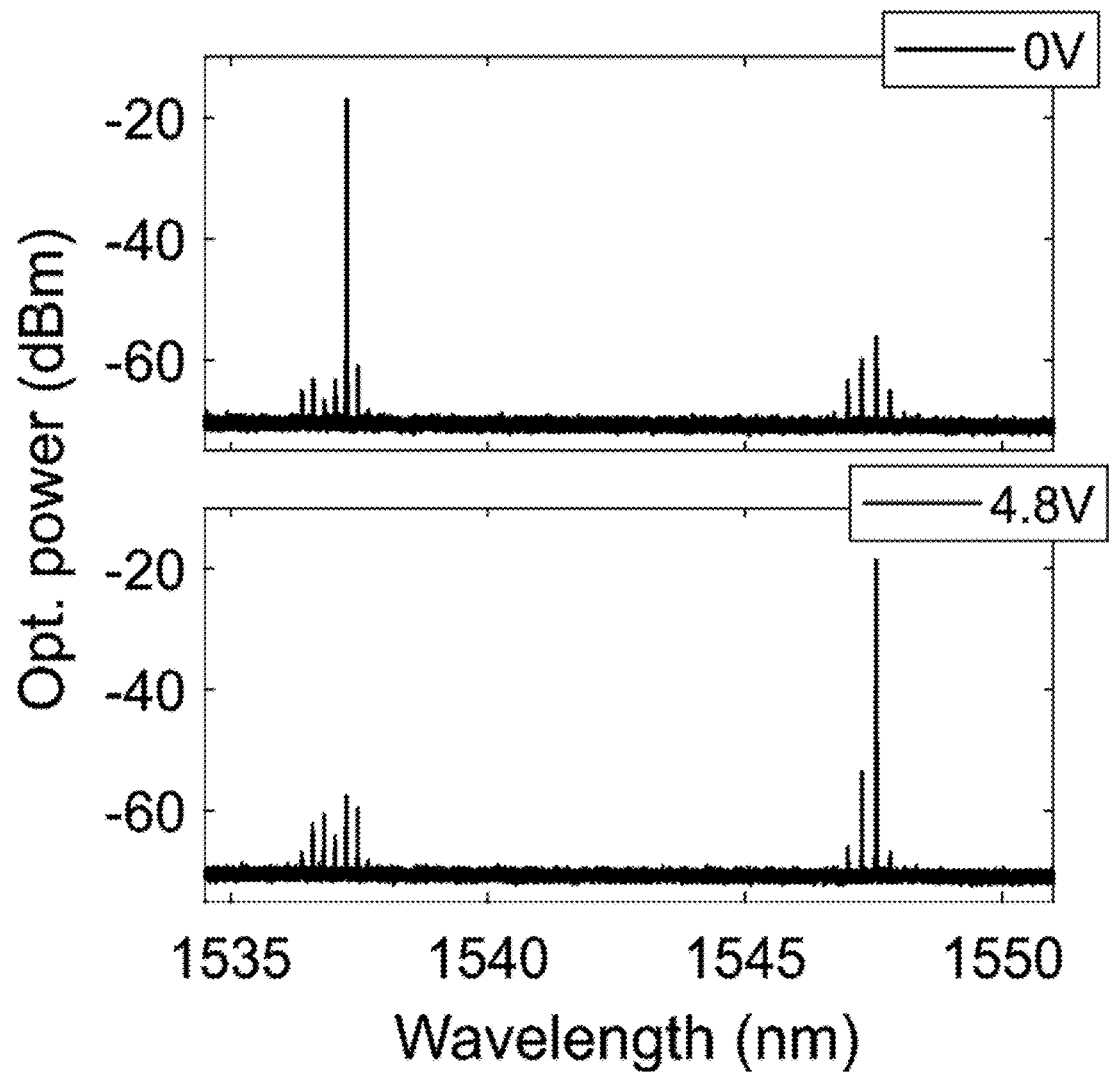
FIG. 8 shows an exemplary dual-mode laser spectrum with two primary wavelengths and associated side modes, to illustrate embodiments of the present invention.

It should, however, be realized that each wavelength of interest may be surrounded by a small peak of slightly different wavelengths, i.e. due to natural spreading. Furthermore, as each wavelength of the laser cavity can potentially also emit with multiple side modes as depicted in FIG. 8, the length of the optical feedback cavity may be selected or optimized, in a straightforward process of simulation and/or experimentation, to also take them into account. For example this may be optimized such that each wavelength including its side-modes is in phase while the other wavelength including its side modes are not in phase or are out of phase.

For example, a simulation tool may be used to simulate the laser response of the lasing cavity such as the software Interconnect (Lumerical) or PICwave or Harold (Photon Design). Particularly, the wavelengths emitted from the lasing cavity and their longitudinal mode separation may be determined. For example, in a series arrangement as depicted in two of the examples in FIG. 6, the longitudinal modes may differ. The evolution of the phase difference between the emission wavelength components as function of propagation distance can then be determined, optionally including the phase difference between the neighboring longitudinal modes of the main emission wavelengths. This will lead to the identification of different distances (due to periodicity) for which the main emission wavelengths are completely out of phase or generally, in a predetermined phase relationship to each other (such as not in phase), in case a more complex application would require so. This also allows to select distances from these different distances for which the neighboring longitudinal modes are in phase with their corresponding main wavelength, or, failing to find such distance, the best approximation thereof. Then, the minimal feedback cavity length can be determined to provide the selected distance of light propagation (taking a factor ½ into account for the reflection), bearing in mind the space required to accommodate the components e.g. at least the variable phase shifting element or at least the variable phase shifting element and an attenuator 8 (optionally controlled by signal 9) to be implemented in the feedback cavity. Thus, in a straightforward process, a length for the optical feedback cavity can be selected to be longer than the minimal required length, to result in two wavelengths to be in anti-phase (or any desirable relationship between the phase of a plurality of wavelengths e.g. a variable degree of not being in phase), and to result in, or approximate, the longitudinal modes being in-phase with their main wavelength.

The variable phase shifting element 6 is adapted to apply a controllable phase shift, e.g. a phase shift that, over its controllable range, is sufficient to cover the different wavelengths or subsets of wavelengths that are envisioned to be selected as controllable outputs of the laser. For example, the upper limit of the controllable phase shift may be $2\pi$, e.g. which would lead to a total shift of the spectral response of the Fabry-Perot by one period. However, the propagation time and losses of the phase shifting element may differ from a standard waveguide, such that the specific characteristics of the phase shifting element may be considered in the design process, as would be evident to the skilled person, e.g. to account for the influence of the phase shifting element when calculating the optical feedback cavity length and mirror position.

The variable phase shifting element 6 may comprise a material (e.g. lithium niobate, amongst others) that has a refractive index that varies as function of the strength of a local electric field, which may be varied by the input signal.

The variable phase shifting element 6 may be an optical phase modulator to adjust the resonating wavelength of the cavity. A multi-wavelength emission of the laser can be controlled by selectively tuning the gain of each available wavelength by controlling (e.g. by controlling electronically) the variable phase shifting element 6. The phase shifting element 6 determines which wavelength is resonating in the Fabry-Perot cavity. The resonating wavelength emission will be favored compared to the other wavelengths. It is an advantage that complete switching between two, three or more possible emission wavelengths can be achieved by controlling (e.g. by controlling electronically) the variable phase shifting element 6. Thus, if multiple wavelengths are sequentially required, e.g. discrete tuning, providing corresponding input signals to the variable phase shifting element 6 results in the desired sequence of multiple wavelengths in a simple, fast and effective manner. As described further hereinbelow, concomitantly, an optical amplitude modulator may be controlled by a further input signal to ensure a good gain of the desired output mode and good attenuation or suppression of the undesired modes. Furthermore, simultaneous emission may also be achieved by carefully tuning the variable phase shifting element 6 and/or the optical amplitude modulator.

FIG. 7 illustrates a further exemplary embodiment of a device 1. It shall be understood that the optional components shown, and discussed hereinbelow, are not necessarily applied in this combination, but can be applied each separately and on its own in an embodiment, or can be applied in any combination of some or all of the optional features. The exemplary device is illustrated by using one of the exemplary lasing cavity 2 configurations of FIG. 6. However, this specific choice is also not considered to be essential, even though particular advantages of this choice are not excluded. It shall also be understood that the drawings, e.g. FIG. 1 and FIG. 7 particularly, are only schematic, and do not necessarily imply a linear arrangement. For example, components may be comprised in curved waveguide structures and/or waveguide structures which are not necessarily aligned in a parallel arrangement, and/or interconnected by additional coupling components. The device may comprise supporting features, as well-known in the art, such as an output coupler, power supply lines, signal lines, electrical insulators and the like.

A device 1 in accordance with embodiments may comprise one or more optical amplitude modulators 71, such as an optical attenuator or an optical amplifier, to control the feedback strength, i.e. to adjust the amount of light fed back to the lasing cavity from the feedback cavity. Optionally the attenuator can be electronically controlled or is controllable by a signal 9. The use of an attenuating element 8 can be or is required to limit the coupling between the laser and the optical feedback cavity which is an external cavity. An active or passive element can be used to control and to adjust the amount of light being fed back to the laser cavity from the optical feedback cavity. The attenuator 8 can be either passive or active and optionally electronically controlled or controllable by a signal 9. The amount of light fed back inside the laser cavity should be less than 1% as an upper range and, depending on the laser characteristics, preferably be below 0.1% of the total amount of light output of the laser. The amount light fed back inside the laser cavity should be above 0.001% as a lower range and preferably above 0.01% as lower amount do not have any effect on the laser system.

For example, the strength of the feedback may determine, or at least influence, the possible gain variation that can be induced by the interferometric effect of the optical feedback cavity. The amplitude modulator therefore offers an advantage of improving the efficiency of the device by controlling (e.g. by controlling electronically) the strength of the feedback to ensure a strong controllable gain variation. The at least one amplitude modulator, e.g. attenuator and/or amplifier, may adapted to receive a control signal, e.g. a current or voltage, to control the amplitude modulation, e.g. attenuation and/or amplification, of light fed back to the lasing cavity. The use of an attenuator is preferred and may be required as a too strong coupling between the optical feedback cavity and the lasing cavity can result in dynamic instability of the laser. To control the feedback strength, the optical amplitude modulator may be used to precisely control the amount of light being fed back to the laser. However, once an optimal range of feedback strength is determined (i.e. in the design process), the attenuator element is preferred compared to an amplifier. The attenuator element may be used as a fully passive element by optimizing its length, e.g. not requiring active control of its control signal, which thus may be configured to receive a constant supply voltage or current in normal operation of the device. This does not imply that active control may have its advantages, which is therefore not explicitly excluded.

A device in accordance with embodiments may comprise a splitter 72 for separating a laser light output from the optical feedback cavity. For example, the splitter may be located between the optical feedback cavity and the lasing cavity, to split light received from the lasing cavity into a component fed into the optical feedback cavity and a component provided as a laser light output or to split light received from the optical feedback cavity into a component fed back into the lasing cavity and a component provided as a laser light output. Alternatively, the splitter may be integrated in the optical feedback cavity, e.g. at a position along its length (along the optical axis). This may be particularly advantageous when the lasing cavity has (only) a single output coupled to the optical feedback cavity. The splitter may be adjustable to control the feedback strength, e.g. to ensure a steadier output power than using a partially reflective mirror. In particular the splitter can reduce the feedback to the lasing cavity to maintain stability of the laser. Alternatively, the lasing cavity may have two outputs, e.g. at respectively both ends of the lasing cavity, one for transmitting light to the optical feedback cavity and one for providing the laser light output.

A device in accordance with embodiments of the present invention may also comprise a modulator and/or a demodulator for Wavelength Division Multiplexing, such that the device forms a transceiver for telecommunications.

Figure 5:
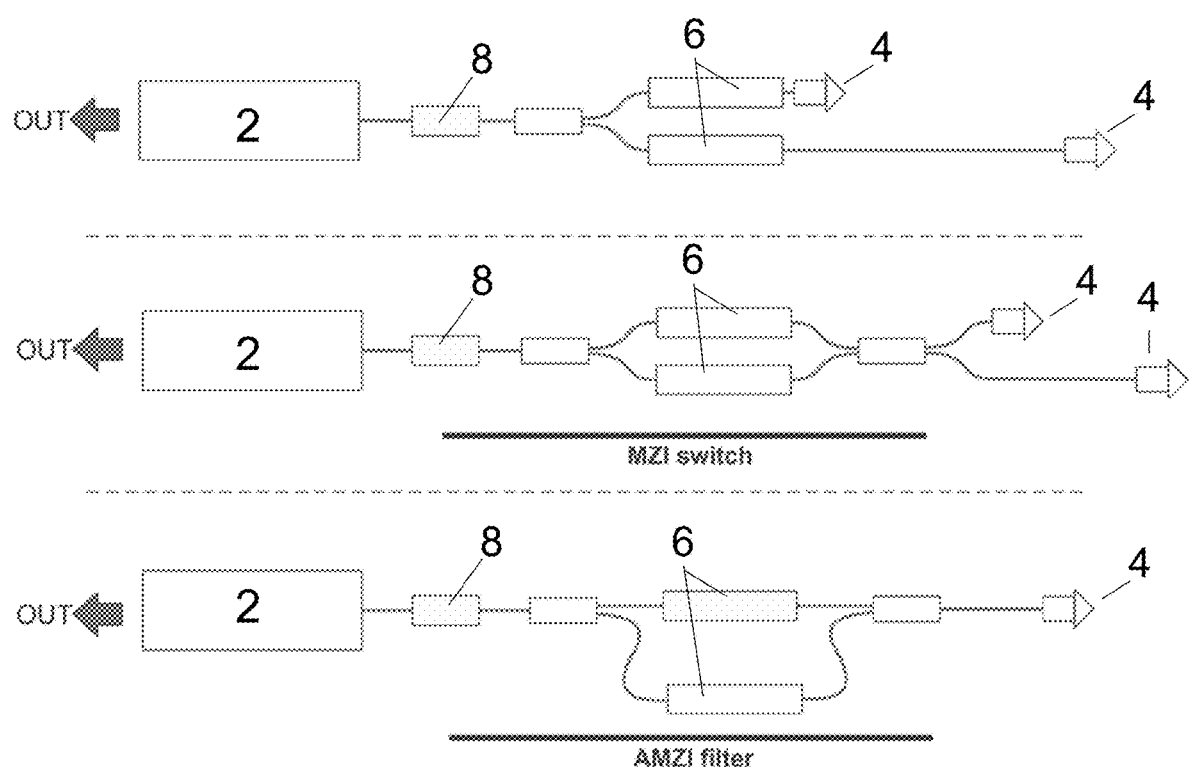
FIG. 5 shows various exemplary devices in accordance with embodiments of the present invention.

Referring to FIG. 5 (top row), a device in accordance with embodiments of the present invention may also comprise a plurality of optical feedback cavities operably coupled to the lasing cavity, e.g. the optical feedback cavities being operably arranged in a parallel configuration, e.g. receiving light from the lasing cavity (and transmitting back-reflected light from the optical feedback cavities back into the lasing cavity) via a splitter between the lasing cavity and the plurality of optical feedback cavities. Alternatively, referring to FIG. 5, middle row, instead of a splitter, a Mach-Zehnder interferometer (MZI) may be operably arranged between the lasing cavity and the plurality of optical feedback cavities. This MZI may be adapted for controlling (e.g. electronically) the splitting ratio between the optical feedback cavities, e.g. in response to an MZI control signal. Thus, a more flexible control of the multi-wavelength laser can be achieved, at the cost of an increased complexity of the design and the control technique.

Each optical feedback cavity may comprise a variable phase shifting element for receiving an input signal to control a phase shift of light propagating in the optical feedback cavity e.g. electronically. The optical feedback cavities may have different lengths. This has the advantage that the combined effect of the plurality of optical feedback cavities could lead to a stronger forcing. Furthermore, since each variable phase shifting element can be controlled independently, such configuration may enable the selection of two or more wavelengths for simultaneous emission from a larger plurality of wavelengths supported by the lasing cavity, e.g. selecting any combination of two wavelengths from three or more wavelengths.

Referring to FIG. 5, bottom row, a device in accordance with embodiments of the present invention may also comprise one or more asymmetric Mach-Zehnder interferometers (AMZI) as a wavelength selective filter, forming the optical feedback cavity. The variable phase shifting element(s) may thus shift the spectral response of the AMZI.

Note that in FIG. 5, a laser light output via a second facet of the lasing cavity is illustrated, even though embodiments are not limited thereto. For example, light may be coupled out via a further splitter or via the reflective elements 4.

In a further aspect, the present invention relates to the use of a device in accordance with embodiments to switch between a plurality of output laser wavelengths for different communication channels in telecommunication, e.g. in Wavelength Division Multiplexing (WDM). Thus, a compact, robust, fast and energy-efficient optical source for telecommunication systems can be provided.

In a further aspect, the present invention relates to the use of a device in accordance with embodiments to generate a terahertz (THz) signal for use in medical or dental imaging, non-destructive testing (e.g. concrete or building inspection), and/or spectroscopy.

Terahertz sources based on photonic integration technology, as known in the art, may require two distinct wavelengths superimposed in an active medium to generate a beat frequency, such that the following electrons emit THz radiation. The efficiency is, however, strongly dependent on the optical power of the two originating wavelengths. Therefore, a device in accordance with embodiments can be used as an active stabilizer to maximize the efficiency in THz generation.

In spectroscopy applications, multiple wavelengths can be used to measure different wavelength absorption regions and/or to measure a reference at the same time to eliminate environmental background effects.

In structural health monitoring and similar sensing applications, optical fibers with inscribed Fiber-Bragg-Gratings may be used to detect strain and temperature variations. A cost-effective method is to sequentially read out each sensor using a laser which is locked onto the slope of the grating. This results in variations in reflected optical power when the sensors are loaded and can be used for their analysis. A device in accordance with embodiments of the present invention can be used to address multiple sensors at once, which could speed up the measurement process and even provide a continuous measurement by using a suitable multi-wavelength system. An interrogation system can be co-integrated with the photonic integrated circuit device to provide a compact and cost-effective sensing device.

In a second aspect, the present invention relates to a method for switching the laser light output wavelength of a lasing cavity 2 integrated on a photonic integrated circuit device 1. The lasing cavity is adapted for resonating at a plurality of discrete wavelengths, i.e. without requiring an external cavity. The method comprises coupling light out of the lasing cavity 2 and into an optical feedback cavity 3 integrated on the photonic integrated circuit device. The method comprises reflecting the light propagating in the optical feedback cavity 3 and coupling the reflected light back into the lasing cavity 2. The method comprises controlling, e.g. electronically controlling, an input signal 7 of a variable phase shifting element 6 in the optical feedback cavity 3 to control a phase shift of the light propagating in the optical feedback cavity. For at least a first value of the input signal, a first phase shift of the light (corresponding to the first value of the input signal, as caused by the variable phase shifting element in response to that input signal) causes a first wavelength of the plurality of discrete wavelengths to be at least a factor of 10 dB, e.g. at least 20 dB, such as at least or up to 50 dB, stronger than at least a second wavelength of the plurality of discrete wavelengths. For at least a second value of the input signal (different from the first value), a second phase shift (corresponding to the action of the variable phase shifting element for that input signal) of the light causes the second wavelength of the plurality of discrete wavelengths to be at least a factor of 10 dB stronger, e.g. at least 20 dB, e.g. up to or at least 50 dB, than at least the first wavelength of the plurality of discrete wavelengths.

The step of reflecting may be performed such that, e.g. by using a suitable distance of the reflective element with respect to the point where light is coupled between the lasing cavity and the optical feedback cavity, at least a subset of the plurality of discrete wavelengths, e.g. at least the first wavelength and the second wavelength, of the light reflected back by the reflective element 4 is not in phase or is out of phase at that point of coupling light between the lasing cavity and the optical feedback cavity, e.g. at a first surface 5 of the lasing cavity. Out-of-phase may refer to being completely out of phase, i.e. in anti-phase (phase difference of about $\pi$), or to a different phase difference that differs substantially from being in-phase (phase difference of about $2\pi$).

For example, for a number of n wavelengths of said plurality of discrete wavelengths, the relative phase difference $\Delta\Phi$ between light waves of further e.g. consecutive wavelengths of said n wavelengths may be equal to $2\pi/n$. The wavelengths can be ordered in a way so that the relative phase difference between light waves of further e.g. consecutive wavelengths of said n wavelengths in the said order equals $2\pi/n$. The relative phase difference relates to the light reflected back by the reflective element (4) and refers to the phase difference at the position of the front surface (5).

The step of controlling the input signal (e.g. by electronic control) may comprise adding a controllable phase shift to the light in response to the input signal, wherein the controllable phase shift covers at least a phase shift range of $2\pi\cdot(n-1)/n$, in which n is a number of wavelengths of said plurality of discrete wavelengths. For example, the controllable phase shift may cover a phase shift range of at least $2\pi$. It should be noted that this may take both forward and backward propagation into account, considering the back-reflected light. Therefore, the controllable phase shift may cover at least a phase shift range of $\pi\cdot(n-1)/n$ when considering a single direction of propagation, and thus a phase shift range of at least $2\pi\cdot(n-1)/n$ when considering both directions.

The step of controlling (e.g. by controlling electronically) the input signal may be adapted for, at least, causing the controllable phase shifts equal to $2k\pi/n$, where k=0, 1, ... , n-1, for a corresponding plurality of values of the input signal.

The method may also comprise controlling (e.g. electronically) a further input signal of an optical amplitude modulator 71 in the optical feedback cavity to control the amount of light fed back to the lasing cavity from the feedback cavity. The optical amplitude modulator is preferably an attenuator. The attenuator may be passive or active.

Where the present invention is described hereinabove with reference to specific embodiments of a method and specific embodiments of an integrated photonic circuit device, this is solely for the sake of clarification and not to be construed as limiting the invention. The skilled person will understand that options and features only described with reference to the device also apply to the method, and vice versa.

Aspects of the present invention will now be illustrated by various examples. These examples are intended to aid the skilled person in understanding aspects of the present invention and reducing the invention to practice, and should not be construed as limiting the invention, even though specific examples may be considered as representing embodiments of the invention. These examples used the foundry of SMART Photonics NV, Netherlands, based on the indium phosphide wafer platform. The building blocks of this foundry (Portable Development Kit) provided, conveniently, the design specifications of the components used, without requiring customization.

FIG. 9 to FIG. 15 illustrate different exemplary structures in accordance with embodiments of the present invention. For the sake of clarity, only the device features that directly relate to the functionality of embodiments of the present invention are shown, even though a reduction to practice might include additional components, which would be self-evident and straightforward to implement for the person skilled in the art. For example, additional components (without limitation thereto) may include isolation sections (for electrical isolation between component blocks), mode filters (for avoiding higher order modes in the laser), and/or shallow/deep etch transitions (e.g. some components may be shallowly etched, while strong waveguide bends may require deep etching).

The length of the semiconductor optical amplifier SOA1 is in each of these examples 500 µm. The length of the semiconductor optical amplifier SOA2 which operates as an active amplitude modulator in the external cavity is 300 µm, and the electro-optical phase modulator EOPM is 1200 µm long. This length is sufficient to give a tunable phase range of $2\pi$, i.e. $4\pi$ when considering that a wave passes once in a forward direction and once when reflected. Control of the emission of a dual-wavelength laser is demonstrated. The INTERCONNECT (offered by Lumerical) circuit simulation tool was used to simulate the laser response.

Figure 9:
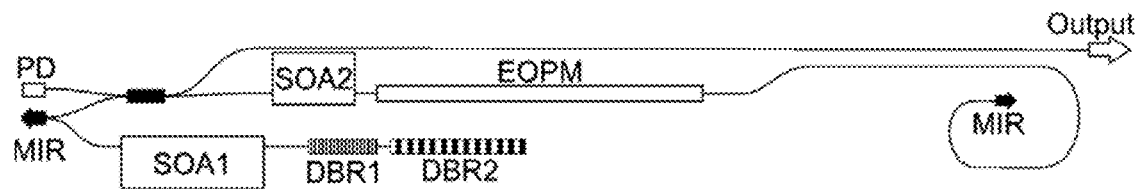
FIGS. 9 to 15 illustrate various circuits designed in accordance with embodiments of the present invention, relating to examples for illustrating embodiments of the present invention.
Figure 10:
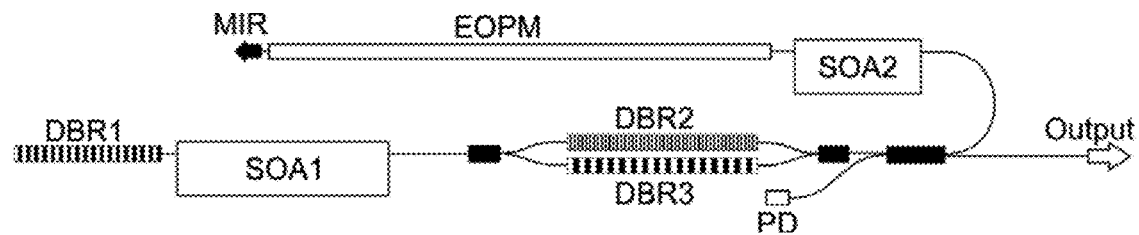
Figure 11:
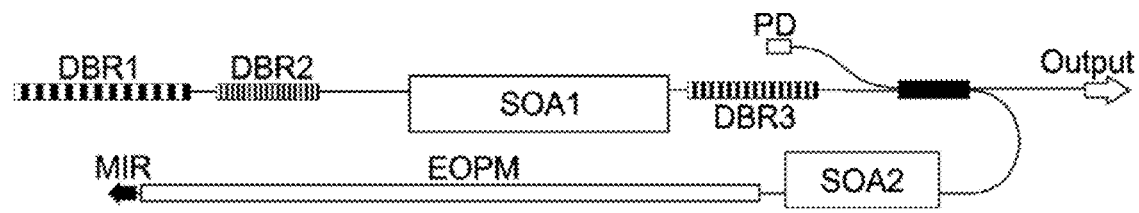
Figure 12:
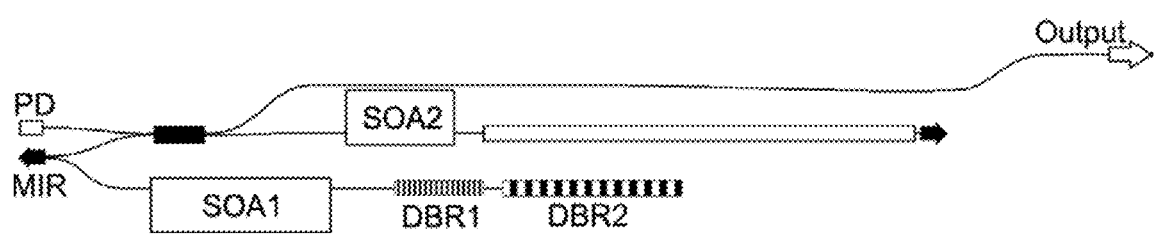
Figure 13:
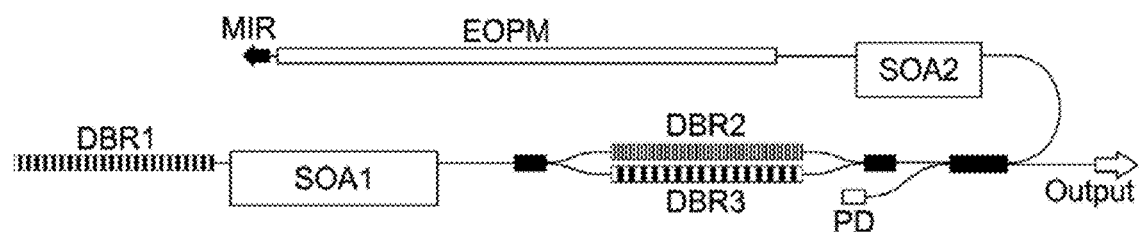
Figure 14:
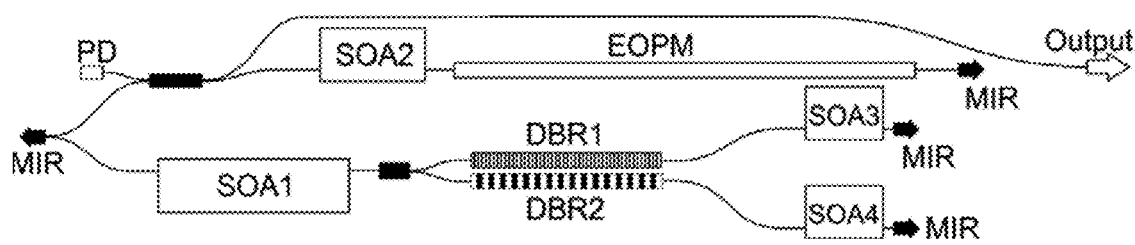
Figure 15:
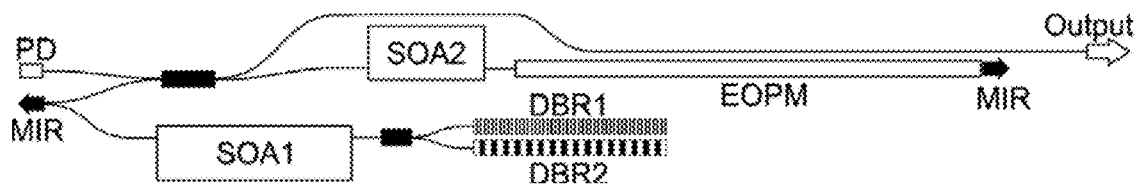

| | Length DBR1 (µm) | Length DBR2 (µm) | Length DBR3 (µm) | Length feedback cavity (µm) | Wavelength $\lambda 1$ (nm) | Wavelength $\lambda 2$ (nm) |
|---|---|---|---|---|---|---|
| FIG. 9 | 250 | 500 | N/A | 4850 | 1544.55 | 1535.44 |
| FIG. 10 | 350 | 450 | 450 | 2800 | 1540.65 | 1539.42 |
| FIG. 11 | 350 | 200 | 250 | 2400 | 1540.52 | 1539.45 |
| FIG. 12 | 250 | 500 | N/A | 2500 | 1544.55 | 1535.44 |
| FIG. 13 | 480 | 450 | 450 | 3050 | 1540.65 | 1539.42 |
| FIG. 14 | 500 | 500 | N/A | 2500 | 1544.88 | 1535.07 |
| FIG. 15 | 500 | 500 | N/A | 2500 | 1544.88 | 1535.07 |

Switching has been successfully obtained for all lasers showing dual wavelength emission but with varying performances depending on the structure, but also on the chip itself. However, it should be noted that other conditions may have an influence on the performance, such as the laser injection current, temperature and tuning of the DBR response. Therefore, the results discussed hereinbelow should be considered as indicative. Conclusions drawn therefrom may be constrained by variations in operating conditions, and a thorough evaluation of any specific design preferably would include an experimental analysis of sufficient statistical power, in which intra-die and inter-die variability as well as variations in the laser operating conditions, such as injection current, temperature and tuning of the DBR response, are taken into account.

Figure 16:
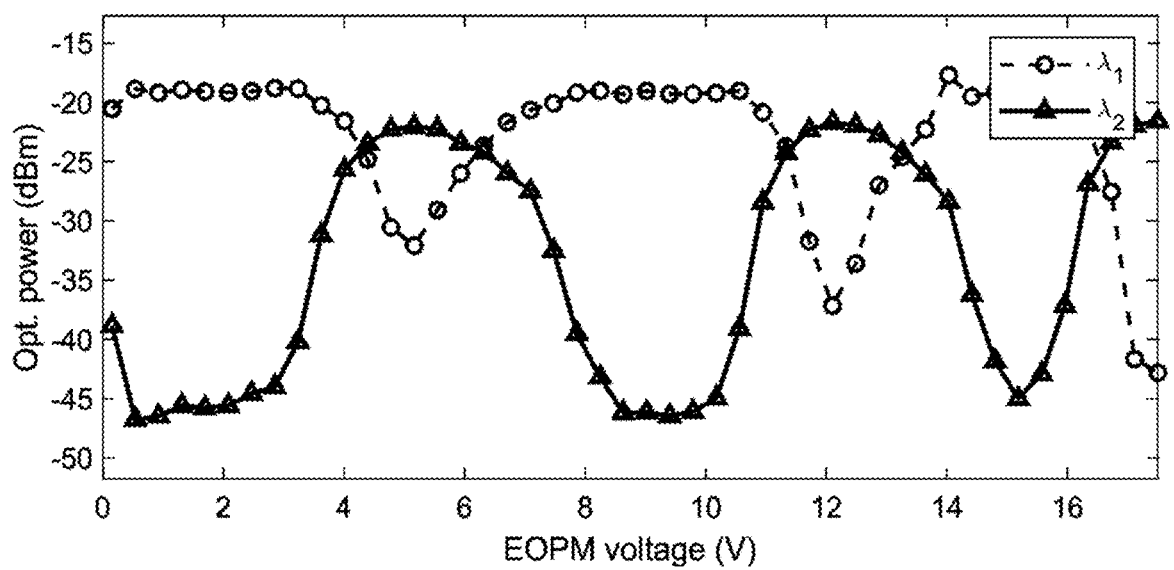
FIG. 16 and FIG. 17 illustrate the optical power (in dBm) versus a control voltage provided as input to the electro-optical phase modulator in exemplary circuits in accordance with the example of FIG. 9.
Figure 17:
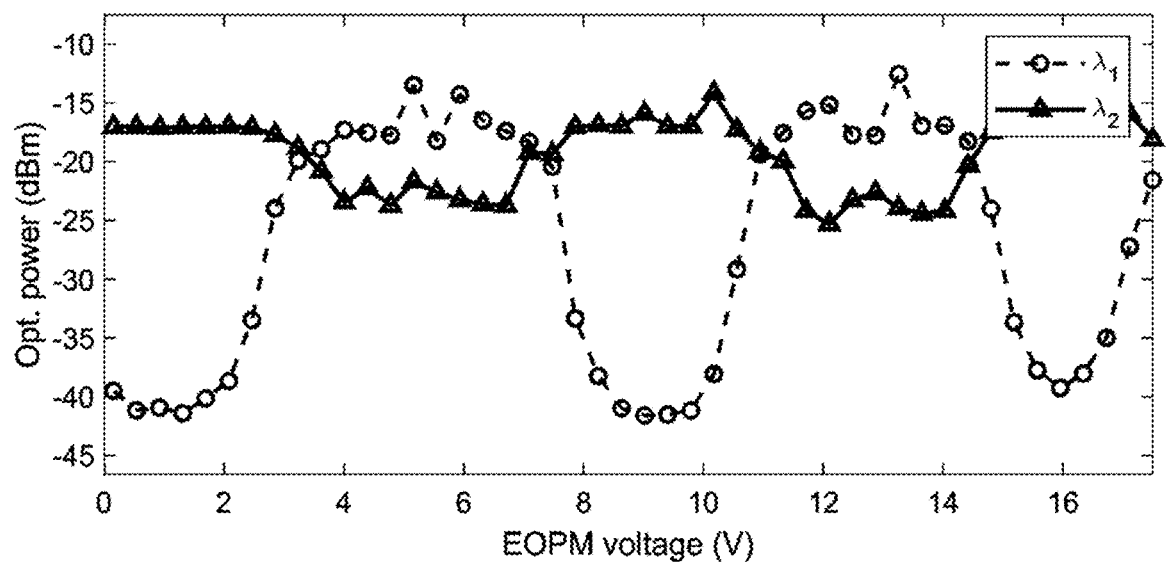
Figure 18:
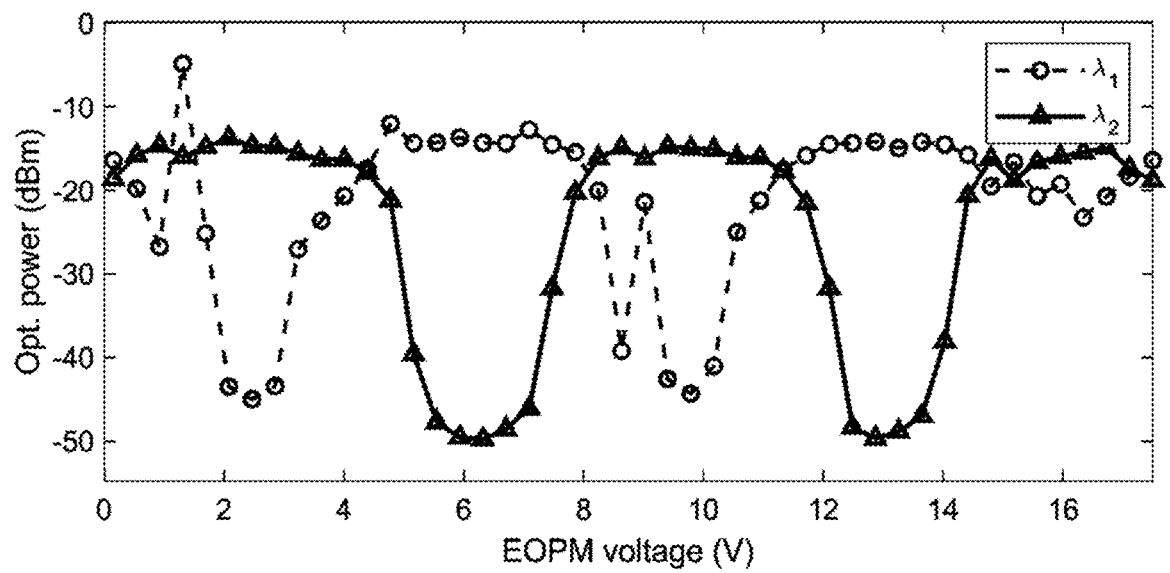
FIG. 18 and FIG. 19 illustrate the optical power (in dBm) versus a control voltage provided as input to the electro-optical phase modulator in exemplary circuits in accordance with the example of FIG. 12.
Figure 19:
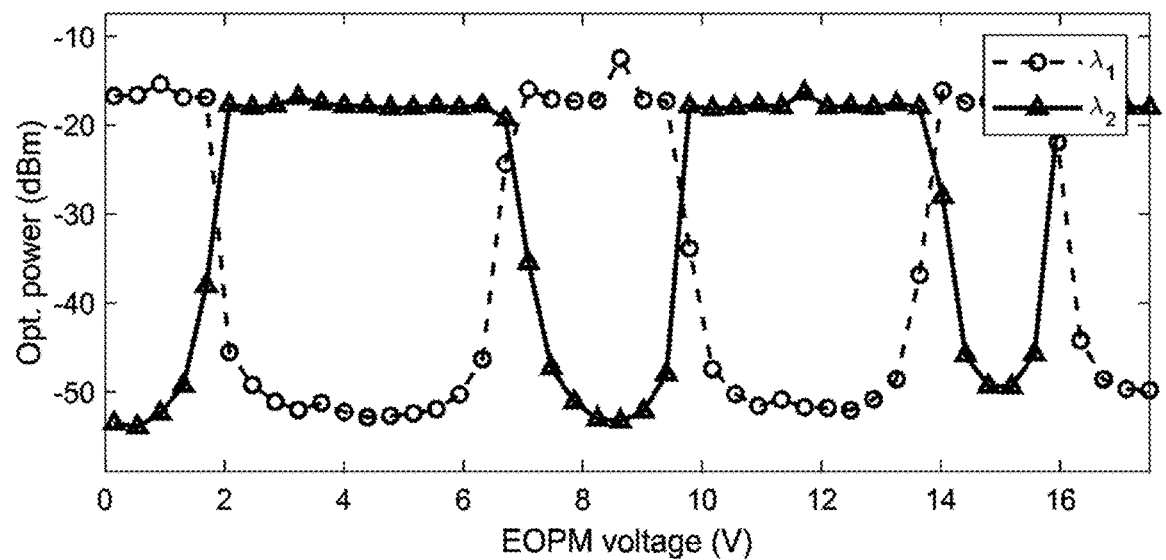
Figure 20:
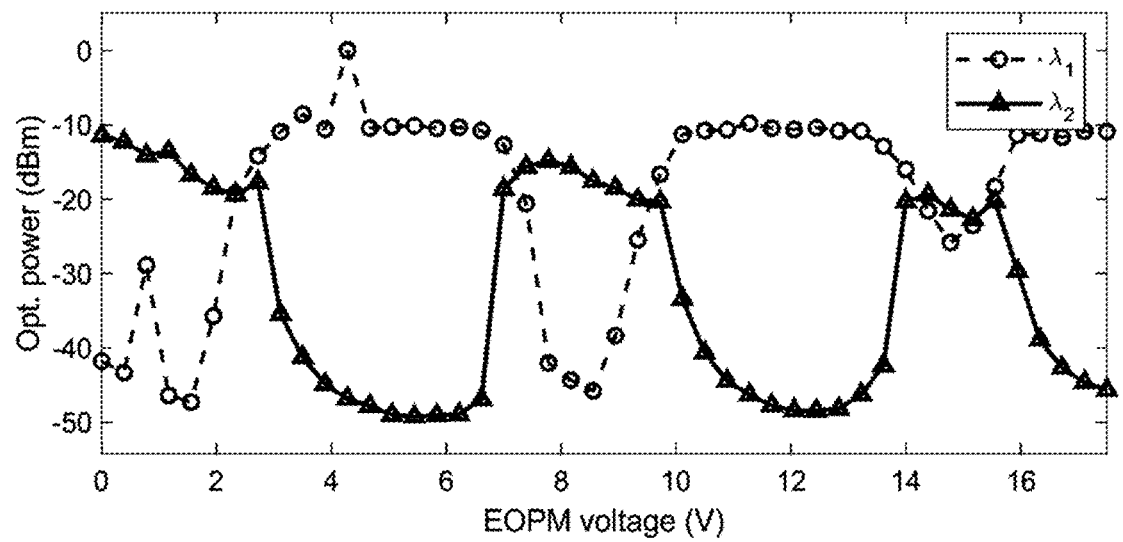
FIG. 20 and FIG. 21 illustrate the optical power (in dBm) versus a control voltage provided as input to the electro-optical phase modulator in exemplary circuits in accordance with the example of FIG. 10.
Figure 21:
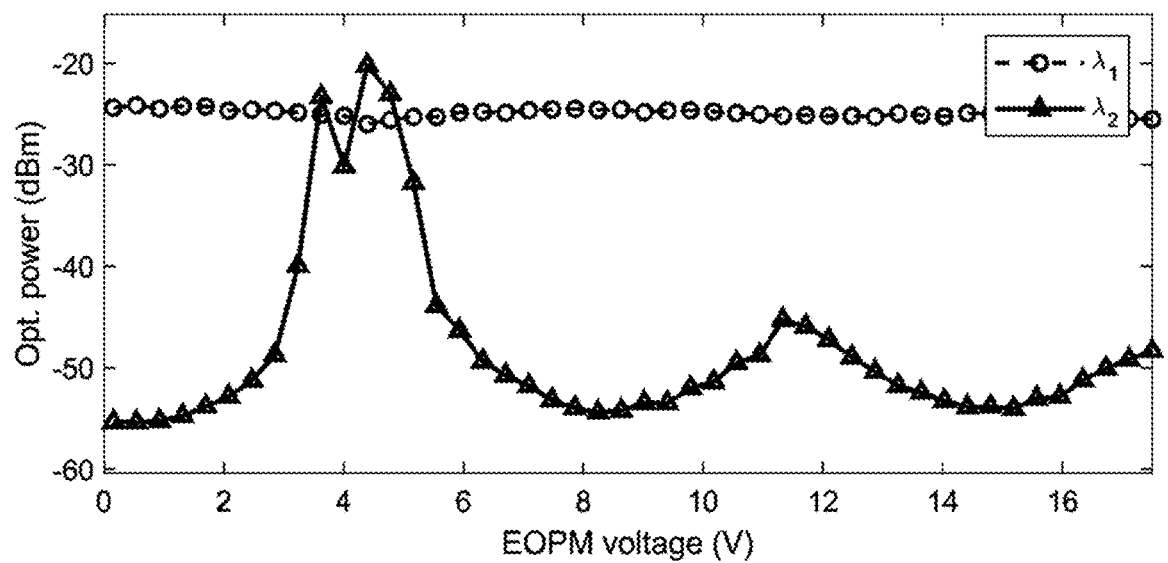
Figure 22:
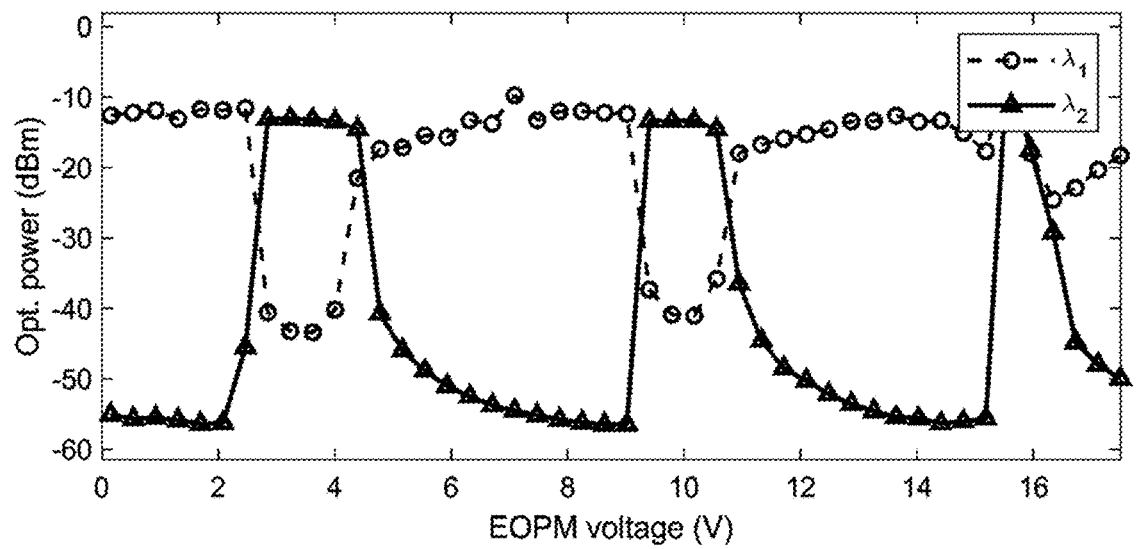
FIG. 22 and FIG. 23 illustrate the optical power (in dBm) versus a control voltage provided as input to the electro-optical phase modulator in exemplary circuits in accordance with the example of FIG. 13.
Figure 23:
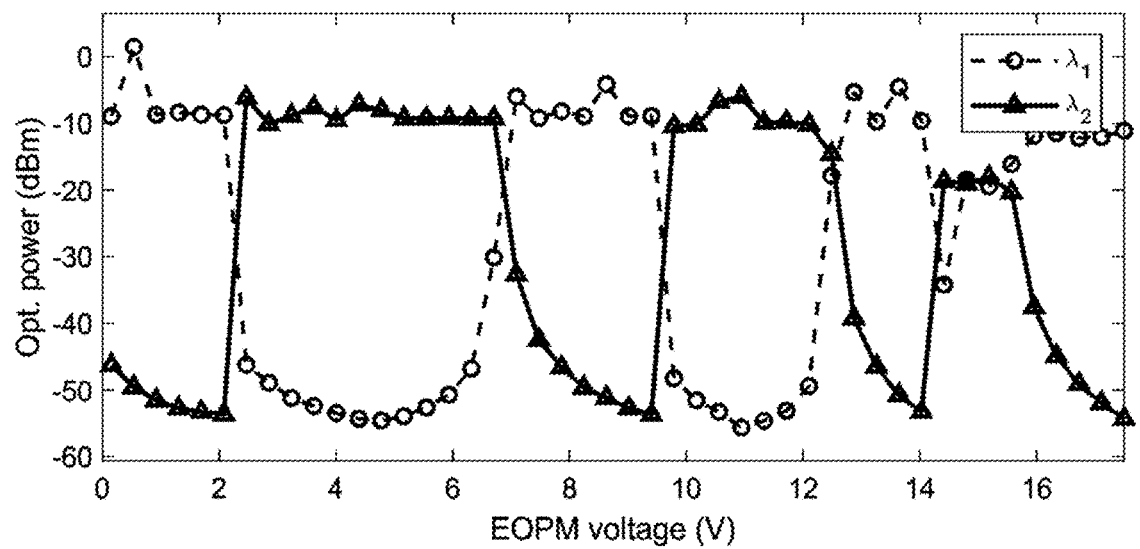

FIG. 16 and FIG. 17 show the output power for each wavelength when varying the optical feedback phase, measured for two different chips from different wafers, for the structure of FIG. 9. The same is illustrated in FIGS. 18 and 19 for the structure of FIG. 12. These structures (i.e. shown in FIG. 9 and FIG. 12) are substantially identical, but with a different feedback cavity length. In these examples, a clear switching between the two wavelengths can be observed. In FIG. 16 and FIG. 17, it can be seen that one of the wavelengths dominates and is only partially suppressed by 5 to 10 dB. The case of FIG. 18 and FIG. 19 appears to be more balanced but clear differences can be observed between the two different chips. Thus, the cavity length of the structure in FIG. 12 seems to be better fitted, but, even for the non-optimal cavity length in the structure of FIG. 9, still some control over the laser emission can be achieved. FIG. 20 and FIG. 21 show similar results for two different wafers according to the structure of FIG. 10, while FIG. 22 and FIG. 23 show the same for the structure of FIG. 13. The structures of FIG. 10 and FIG. 13 are similar, but the latter has a longer DBR 1 (central DBR) and a slightly longer feedback cavity (3050 versus 2800 µm). Again, some significant differences can be observed between the different structures and chips. In FIG. 21, one wavelength remains strongly dominant, but the depressed mode can be triggered by tuning the feedback phase. Surprisingly, the dominant mode seems to remain almost unchanged, while the power of the depressed mode can even exceed its emission by 5 dB.

The other figures, FIG. 20, FIG. 22 and FIG. 23, show more typical results with good switching performances with some qualitative changes from one case to the other. Similar results have been obtained for the structures of FIG. 14 and FIG. 15, which did not exhibit any surprising behavior compared to the others.

Figure 24:
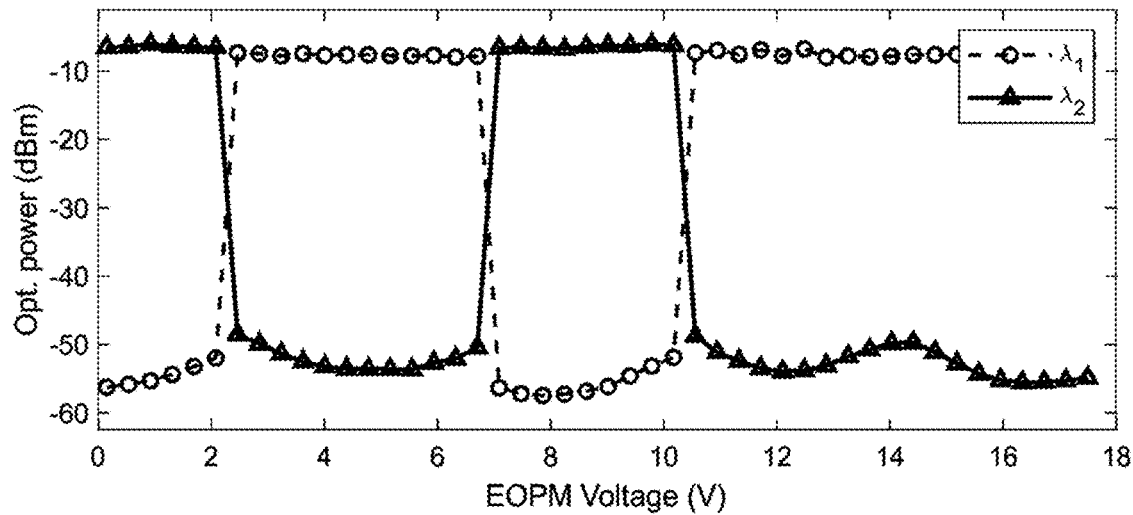
FIG. 24 and FIG. 25 illustrate the optical power (in dBm) versus a control voltage provided as input to the electro-optical phase modulator in exemplary circuits in accordance with the example of FIG. 11.
Figure 27:
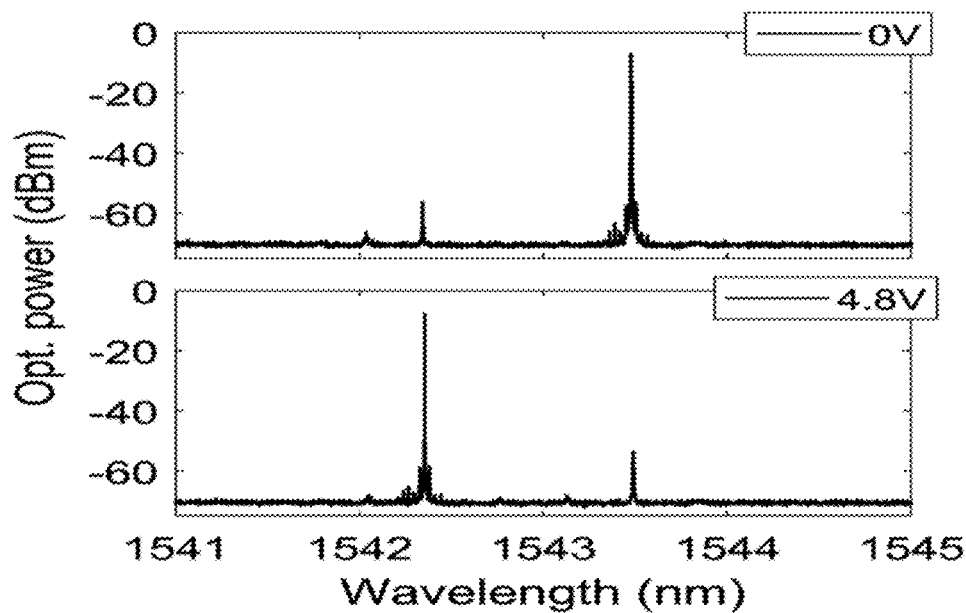
FIG. 27 shows the optical power as function of wavelength for respectively two control signals effecting a substantially complete wavelength switching between two laser wavelengths separated by about 1 nm, in an example illustrating embodiments of the present invention.

A particularly pronounced switching behavior was observed for the structure of FIG. 11, as illustrated in FIG. 24. A suppression ratio for the extinct mode of more than 55 dB was observed for both wavelengths. The approach in accordance with embodiments of the present invention has been experimentally validated for different wavelength separations, such as 1 nm and 10 nm differences. An example of substantially complete dual-wavelength switching at a wavelength separation of about 1 nm is illustrated in FIG. 27, for a device and EOPM tuning case as illustrated in FIG. 11 and FIG. 24.

Figure 25:
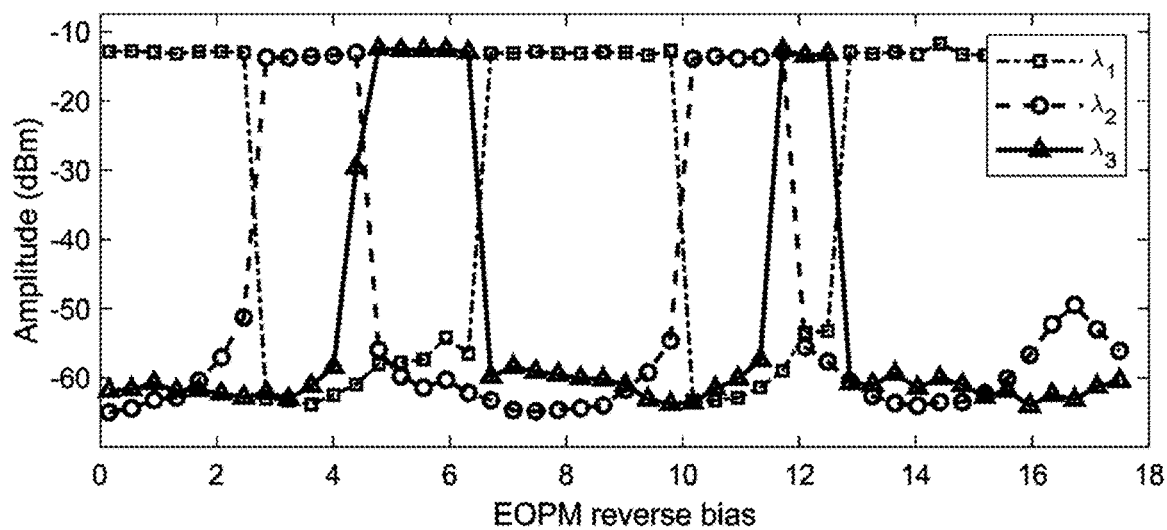
Figure 28:
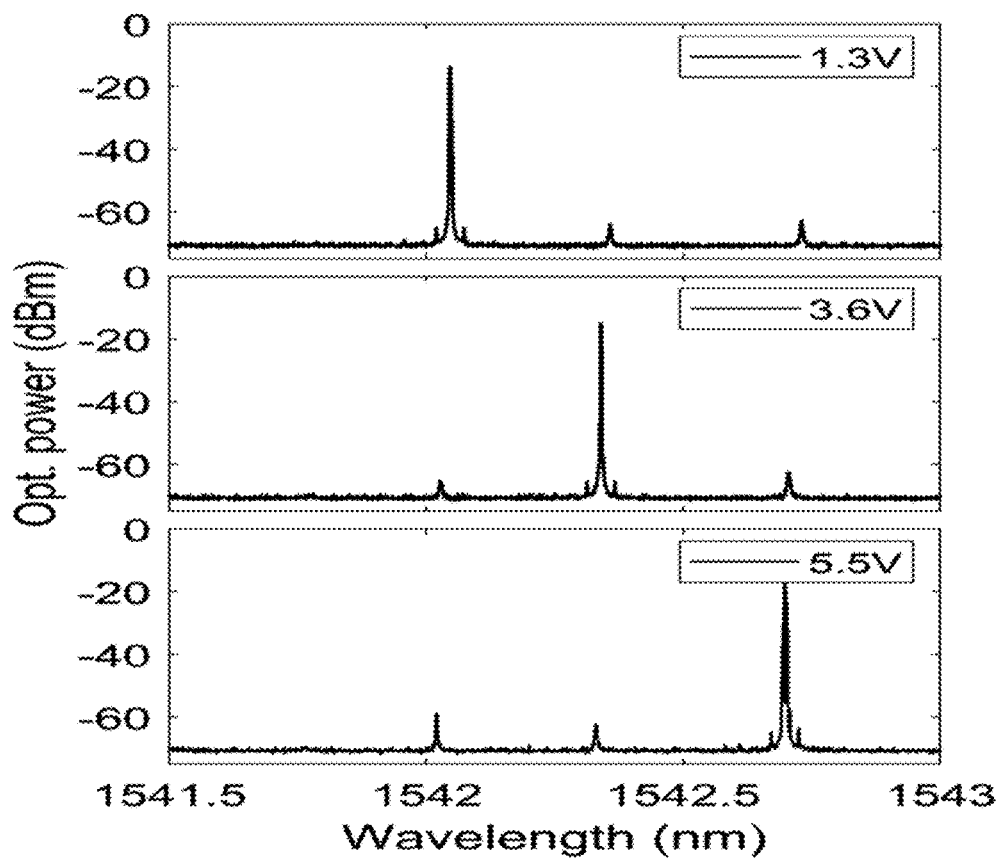
FIG. 28 shows the optical power as function of wavelength for respectively three control signals effecting a substantially complete wavelength switching between three laser wavelengths separated by less than 1 nm, in an example illustrating embodiments of the present invention.

Furthermore, a three-wavelength switching configuration was even achieved on a chip manufactured according to this structure, as illustrated in FIG. 25. In this example, the third wavelength corresponds to an extra longitudinal mode, which was initially intended to be suppressed. An example of substantially complete three-wavelength switching at a wavelength separation of less than 1 nm is illustrated in FIG. 28, for a device and EOPM tuning case as illustrated in FIG. 11 and FIG. 25.

Figure 26:
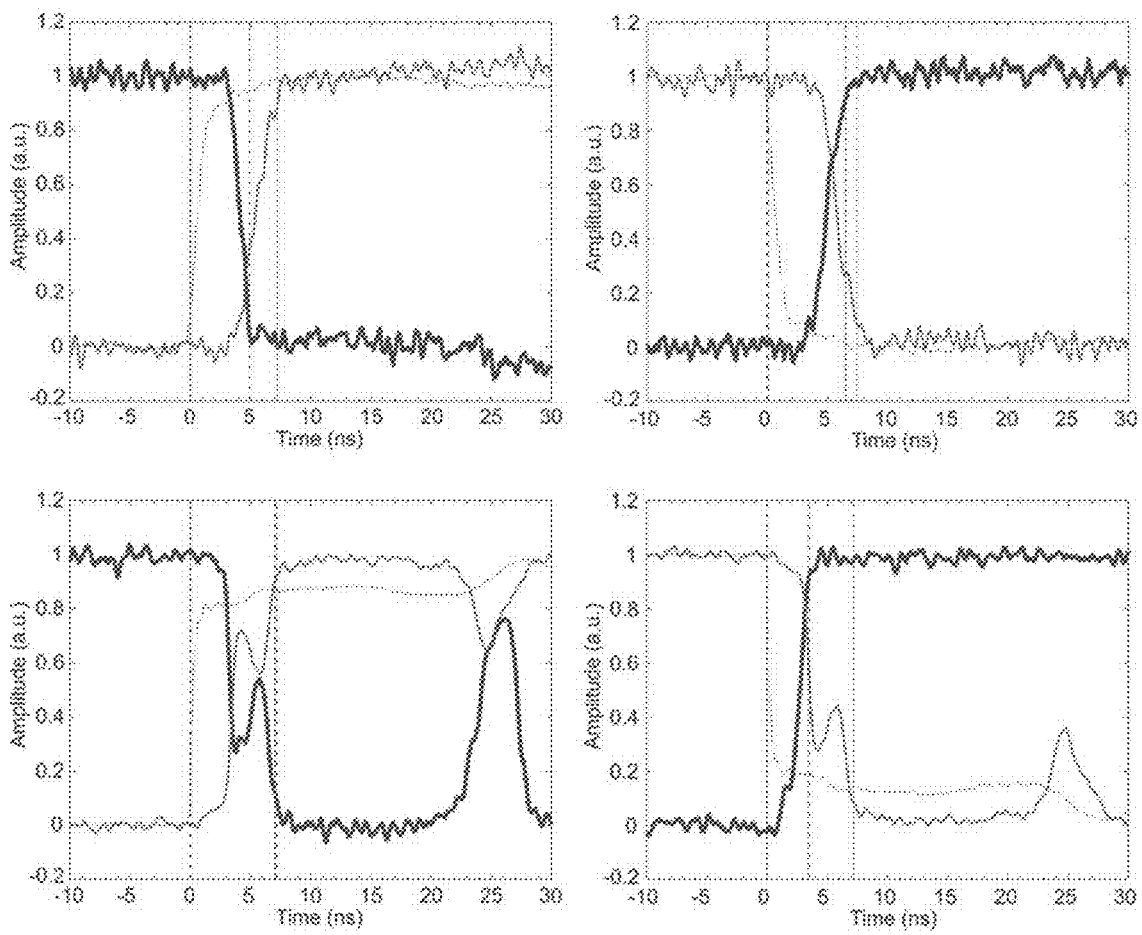
FIG. 26 shows the normalized optical power for two wavelengths (thin & thick lines) being switched between one another, together with a rising (left) and falling (right) edge of their control signal (thin dotted line) as a function of time, in an example illustrating embodiments of the present invention. Different slopes of the control signal have been used for the top and bottom graphs to illustrate the potential impact on switching times.

Since various applications, such as in telecommunication, require, or benefit from, a high switching speed, the switching speed of the structure of FIG. 10 was evaluated. A switching speed of the order of 5 ns was achieved, when taking into account the total time between the moment the command signal reaches the EOPM and the moment the desired wavelength is emitting at 90% of the targeted output power. Considering only the so-called rise/down time of the two wavelengths of course leads to even more appealing performance. Furthermore, the EOPM that was used has a response time of approximately 1 ns and was not optimized for RF applications. It is to be noted that higher switching speeds can likely be achieved by specifically optimizing the design, including the EOPM, for radiofrequency applications. FIG. 26 shows a representative example of recorded time series of the two distinct wavelengths of a dual-wavelength laser when a step function sent to the EOPM triggers a switching between the two. The input signal sent to the EOPM is overlaid as the thin dotted line for reference. The use of phase modulators—which are known to have a fast response time and large bandwidth—in combination with a short external cavity promises a fast switching capability which would be primarily limited by the response time of the laser itself. In an optimized system, the total switching speed could likely be reduced below the nanosecond range. In this regard, it is to be noted that operating the laser close to a simultaneous emission point—if any, for instance by adjusting the laser current—can also improve the overall switching speed.

The invention claimed is:
1. A photonic integrated circuit device comprising:
   a lasing cavity for resonating at a plurality of discrete wavelengths; and
   an optical feedback cavity operably coupled to the lasing cavity via a front surface of the lasing cavity,
   said optical feedback cavity comprising a reflective element for reflecting light, at least partially, back into the lasing cavity to form a resonant Fabry-Perot cavity between the front surface and the reflective element, said optical feedback cavity further comprising a variable phase shifting element adapted for receiving an input signal to control a phase shift of light propagating in the optical feedback cavity,
wherein the photonic integrated circuit device is configured such that at least a subset of the plurality of discrete wavelengths of light rays that are reflected back by the reflective element that are supported by the lasing cavity are not in phase and do not resonate together in the lasing cavity, and
wherein the photonic integrated circuit device is configured to superpose the light rays reflected back by the reflective element onto forward propagating light rays inside the laser cavity which causes one mode to resonate and be boosted.

2. The photonic integrated circuit device according to claim 1, wherein the photonic integrated circuit device is configured such that another mode is attenuated or suppressed, and the photonic integrated circuit device is further configured to control a phase shift of the light propagating in the optical feedback cavity,
wherein a first wavelength of the plurality of discrete wavelengths is boosted to be at least a factor of 10 dB stronger than at least a second wavelength of said plurality of discrete wavelengths,
wherein a second wavelength of said plurality of discrete wavelengths is boosted to be at least a factor of 10 dB stronger than at least the first wavelength of said plurality of discrete wavelengths.

3. The photonic integrated circuit device according to claim 2, wherein the photonic integrated circuit device is configured so that the one mode is boosted at the same time as the another mode is attenuated or suppressed.

4. The photonic integrated circuit device according to claim 1, further comprising an attenuator configured to limit the amount of light being fed back to the laser,
wherein the attenuator is an active attenuator, or a passive attenuator.

5. The photonic integrated circuit device of claim 1, wherein said lasing cavity comprises a gain medium for amplifying light by stimulated emission and optical feedback elements forming the lasing cavity around said gain medium, and
wherein said optical feedback elements comprise one or more distributed Bragg gratings and/or one or more multi-mode interference reflectors.

6. The photonic integrated circuit device according to claim 1, wherein the photonic integrated circuit device has means for electronic control of the optical feedback cavity.

7. The photonic integrated circuit device of claim 1, wherein said reflective element is positioned relative to said front surface such that at least a subset of said plurality of discrete wavelengths of the light reflected back by the reflective element is not in phase or is out of phase at the position of the front surface.

8. The photonic integrated circuit device of claim 1, wherein said reflective element is positioned relative to said front surface such that, for a number n wavelengths of said plurality of discrete wavelengths, the relative phase difference $\Delta\phi$ between light waves of further or consecutive wavelengths of said n wavelengths equals $2\pi/n$, where the relative phase difference relates to the light reflected back by the reflective element and refers to the phase difference at the position of the front surface.

9. The photonic integrated circuit device of claim 1, wherein said variable phase shifting element is adapted for electronically controlling the phase shift of light propagating in the optical feedback cavity by adding a controllable phase shift to the light in response to the input signal,
wherein said controllable phase shift covers at least a phase shift range of $2\pi(n-1)/n$, in which n is a number of wavelengths of said plurality of discrete wavelengths.

10. The photonic integrated circuit device of claim 1, further comprising a plurality of optical feedback cavities operably coupled to the lasing cavity,
wherein said optical feedback cavities are operably arranged in a parallel configuration, each of the plurality of optical feedback cavities comprising a variable phase shifting element for receiving a corresponding input signal to control a phase shift of light propagating in said optical feedback cavity,
wherein said optical feedback cavities have different lengths.

11. A method for switching the laser light output wavelength of a lasing cavity integrated on a photonic integrated circuit device, said lasing cavity being adapted for resonating at a plurality of discrete wavelengths, the method comprising:
coupling light out of the lasing cavity and into an optical feedback cavity on the photonic integrated circuit device,
reflecting said light propagating in the optical feedback cavity with a reflective element and coupling the reflected light back into the lasing cavity,
controlling an input signal of a variable phase shifting element in the optical feedback cavity to control a phase shift of the light propagating in the optical feedback cavity,
wherein at least a subset of the plurality of discrete wavelengths of light rays that are reflected back by the reflective element that are supported by the lasing cavity are not in phase and are not resonating together in the lasing cavity,
the method further comprising superposing the light rays reflected back by the reflective element onto forward propagating light rays inside the laser cavity which causes one mode to resonate and be boosted.

12. The method of claim 11,
wherein another mode is attenuated or suppressed,
wherein for at least a first value of said input signal a first phase shift of the light causes a first wavelength of said plurality of discrete wavelengths to be at least a factor of 10 dB stronger than at least a second wavelength of said plurality of discrete wavelengths,
wherein for at least a second value of said input signal a second phase shift of the light causes the second wavelength of said plurality of discrete wavelengths to be at least a factor of 10 dB stronger than at least the first wavelength of said plurality of discrete wavelengths.

13. The method according to claim 12, wherein the one mode is boosted at the same time as the another mode is attenuated or suppressed.

14. The method according to claim 13, further comprising attenuating the amount of light being fed back to the laser,
wherein the attenuating is performed by an attenuator which is an active or a passive attenuator.

15. The method of claim 14, further comprising amplifying light by stimulated emission and optical feedback elements forming the lasing cavity,
wherein said optical feedback elements comprise one or more distributed Bragg gratings and/or one or more multi-mode interference reflectors.

16. The method of claim 12, further comprising electronically controlling the optical feedback cavity.

17. The method of claim 12, wherein the reflective element is positioned relative to said front surface such that at least a subset of said plurality of discrete wavelengths of the light reflected back by the reflective element is not in phase or is out of phase at the position of the front surface.

18. The method of claim 17, further comprising positioning the reflective element relative to said front surface such that, for a number n wavelengths of said plurality of discrete wavelengths, the relative phase difference $\Delta\phi$ between light waves of further or consecutive wavelengths of said n wavelengths equals $2\pi/n$, where the relative phase difference relates to the light reflected back by the reflective element and refers to the phase difference at the position of the front surface.

19. The method of claim 12, wherein said variable phase shifting element is adapted for electronically controlling the phase shift of light propagating in the optical feedback cavity by adding a controllable phase shift to the light in response to the input signal,
wherein said controllable phase shift covers at least a phase shift range of $2\pi(n-1)/n$, in which n is a number of wavelengths of said plurality of discrete wavelengths.

20. The method of claim 12, wherein the photonic integrated circuit device comprises a plurality of optical feedback cavities operably coupled to the lasing cavity,
wherein said optical feedback cavities are operably arranged in a parallel configuration, each of the optical feedback cavities comprising a variable phase shifting element for receiving a corresponding input signal to control a phase shift of light propagating in said optical feedback cavity,
wherein said optical feedback cavities have different lengths.

* * * * *